United States Patent
Khoshnevisan et al.

(10) Patent No.: US 11,582,776 B2
(45) Date of Patent: Feb. 14, 2023

(54) MANAGING CROSS-CARRIER SCHEDULING BY A WIRELESS DEVICE

(71) Applicant: QUALCOMM Incorporated, San Diego, CA (US)

(72) Inventors: Mostafa Khoshnevisan, San Diego, CA (US); Kazuki Takeda, Tokyo (JP); Xiaoxia Zhang, San Diego, CA (US); Jing Sun, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/922,143

(22) Filed: Jul. 7, 2020

(65) Prior Publication Data

US 2021/0037551 A1    Feb. 4, 2021

Related U.S. Application Data

(60) Provisional application No. 62/881,645, filed on Aug. 1, 2019.

(51) Int. Cl.
  *H04W 72/04* (2009.01)
  *H04W 72/12* (2009.01)
  (Continued)

(52) U.S. Cl.
  CPC ....... *H04W 72/1263* (2013.01); *H04L 1/1819* (2013.01); *H04L 5/0044* (2013.01);
  (Continued)

(58) Field of Classification Search
  CPC ......... H04W 72/1263; H04W 72/1289; H04W 72/042; H04W 72/0493; H04W 80/08; H04L 1/1819; H04L 5/0044; H04L 5/0055; H04L 5/0092; H04L 5/0007; H04L 5/001; H04L 5/0037; H04L 5/0053; H04L 27/0006
  See application file for complete search history.

(56) References Cited

U.S. PATENT DOCUMENTS

2018/0014291 A1\* 1/2018 Takeda ............... H04W 72/044
2019/0150173 A1   5/2019 Lee et al.
(Continued)

OTHER PUBLICATIONS

R1-1906224 Enhancements on multi-TRP/panel transmission, NTT DOCOMO, May 13-17, 2019 (Year: 2019).\*
(Continued)

*Primary Examiner* — Mahbubul Bar Chowdhury
(74) *Attorney, Agent, or Firm* — The Marbury Law Group

(57) ABSTRACT

This disclosure provides systems, methods and apparatus, and computer programs encoded on computer storage media, for managing cross-carrier scheduling by a processor of a wireless device. In one aspect, a wireless device may determine that a scheduled cell is configured to be scheduled by a scheduling cell. The wireless device may receive downlink control information (DCI) from a scheduling cell. The wireless device may determine an association of the DCI and an index based on the received DCI. The wireless device may perform cross-carrier scheduling of communications with a first transmit-receive point (TRP) or a second TRP based on the DCI and the associated index.

30 Claims, 15 Drawing Sheets

(51) Int. Cl.
*H04L 1/18* (2006.01)
*H04L 5/00* (2006.01)
*H04W 80/08* (2009.01)

(52) U.S. Cl.
CPC .......... *H04L 5/0055* (2013.01); *H04L 5/0092* (2013.01); *H04W 72/042* (2013.01); *H04W 72/0493* (2013.01); *H04W 80/08* (2013.01)

(56) References Cited

U.S. PATENT DOCUMENTS

| | | | | |
|---|---|---|---|---|
| 2019/0313429 | A1* | 10/2019 | Cheng | H04W 8/24 |
| 2019/0357238 | A1* | 11/2019 | Zhou | H04W 72/1257 |
| 2020/0119869 | A1* | 4/2020 | Taherzadeh Boroujeni | H04B 7/0695 |
| 2020/0154467 | A1* | 5/2020 | Gong | H04W 24/08 |
| 2020/0169990 | A1* | 5/2020 | Takeda | H04W 52/367 |
| 2020/0229161 | A1* | 7/2020 | Raghavan | H04L 5/0091 |
| 2020/0313833 | A1* | 10/2020 | Yi | H04W 52/0212 |
| 2021/0075581 | A1* | 3/2021 | Takeda | H04W 72/042 |

OTHER PUBLICATIONS

R1-1906159, Further discussion on Multi-TRP/Panel transmission, Vivo, May 13-17, 2019 (Year: 2019).*
Huawei., et al., "Enhancements on Multi-TRP/panel Transmission", 3GPP Draft, 3GPP TSG RAN WG1 #97, R1-1906029, 3RD Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727486, 17 pages, Retrieved from the Internet: URL:http://www.3gpp.org/ftp/Meetings%5F3GPP%5FSYNC/RAN1/Docs/R1%2D1906029%2Ezip [retrieved on May 13, 2019], the whole document.
International Search Report and Written Opinion—PCT/US2020/041134—ISA/EPO—dated Sep. 9, 2020. 17 pages.
Qualcomm Incorporated: "Multi-TRP Enhancements", 3GPP Draft, 3GPP TSG-RAN WG1 Meeting #97, R1-1907289, Multi-TRP Enhancements, 3RD Generation Partnership Project (3GPP), vol. RAN WG1, No. Reno, Nevada, May 4, 2019, XP051709312, 25 Pages, Retrieved from the Internet: URL: http://www.3gpp.org/ftp/tsg%5Fran/WG1%5FRL1/TSGR1%5F97/Docs/R1%2D1907289%2Ezip. 25 pages.

* cited by examiner

| TRP1 / First CORESET pool index value | TRP2 / Second CORESET pool index value |
|---|---|
| TRP1 / First PDSCH (or PUSCH) | TRP2 / Second PDSCH (or PUSCH) |

Scheduling Cell: Configured to perform multi-DCI based multi-TRP (some CORESETs associated with a first CORESET pool index value while other CORESETs associated with a second CORESET pool index value)

Scheduled Cell: Configured to perform multi-PDSCH (or multi-PUSCH) multi-TRP

FIG. 5B

| TRP1 / First CORESET pool index value | TRP2 / Second CORESET pool index value |
|---|---|

Scheduling Cell: Configured to perform multi-DCI based multi-TRP (some CORESETs associated with a first CORESET pool index value while other CORESETs associated with a second CORESET pool index value)

Scheduled Cell: Not configured to perform multi-PDSCH (or multi-PUSCH) multi-TRP

FIG. 5C

Scheduling Cell: Not configured to perform multi-DCI based multi-TRP (CORESETs are not associated with a CORESET pool index value or all CORESETs are associated with the same CORESET pool index value)

| TRP1 / First PDSCH (or PUSCH) | TRP2 / Second PDSCH (or PUSCH) |
|---|---|

Scheduled Cell: Configured to perform multi-PDSCH (or multi-PUSCH) multi-TRP

FIG. 5D

MANAGING CROSS-CARRIER SCHEDULING BY A WIRELESS DEVICE

RELATED APPLICATIONS

This claims the benefit of priority to U.S. Provisional Application No. 62/881,645 entitled "MANAGING CROSS-CARRIER SCHEDULING BY A WIRELESS DEVICE" filed Aug. 1, 2019, the entire contents of which are hereby incorporated by reference for all purposes.

TECHNICAL FIELD

This disclosure relates generally to wireless devices, and more particularly to managing wireless devices to perform cross-carrier scheduling.

DESCRIPTION OF THE RELATED TECHNOLOGY

Communication systems may be configured to employ carrier aggregation (CA) to provide sufficient bandwidth to support high data rate communications. A CA system combines bandwidth from distinct frequency bands, each referred to as a component carrier. Each component carrier may be scheduled differently. For example, component carriers for downlink control information, downlink data, uplink control information, and uplink data may each be scheduled independently, referred to as cross-carrier scheduling.

SUMMARY

The systems, methods and devices of this disclosure each have several innovative aspects, no single one of which is solely responsible for the desirable attributes disclosed herein.

One innovative aspect of the subject matter described in this disclosure may be implemented in a wireless device. Some implementations may include determining that a scheduled cell is configured to be scheduled by a scheduling cell, receiving downlink control information (DCI) from the scheduling cell, determining based on the received DCI an association of the DCI and an index, and performing cross-carrier scheduling of communications with a first transmit-receive point (TRP) or a second TRP based on the DCI and the associated index.

In some implementations, the index may include one of the first TRP and the second TRP. In some implementations, determining based on the received DCI the association of the DCI and the index may include determining the association of the DCI and the index based on a field in a payload of the DCI. In some implementations, determining the association of the DCI and the index based on a field in a payload of the DCI may include determining an indication of the index from a field added to the payload of the DCI.

In some implementations, determining the association of the DCI and the index based on a field in a payload of the DCI may include determining an indication of the index from a carrier indicator field (CIF) in the DCI. In some implementations, the CIF may indicate one of a first higher layer parameter and a second higher layer parameter, each associated with a value of the index. In some implementations, the first higher layer parameter may include a CORESET pool index of 0, and the second higher layer parameter may include a CORESET pool index of 1. In some implementations, performing cross-carrier scheduling of communications with the first TRP and the second TRP based on the association of the DCI and the index may include performing cross-carrier scheduling of communications with the first TRP and the second TRP based on the determined index. In some implementations, the scheduling cell may be configured by a PDCCH-Config parameter that includes two CORESET pool index values in CORESETs for an active bandwidth part (BWP) of the scheduled cell. In some implementations, the index may include a Control Resource Set (CORESET) pool index of a CORESET that carries the DCI. In some implementations, the scheduling cell may be configured to perform multi-PDSCH multi-TRP communications. In some implementations, the scheduling cell may be configured by a PDCCH-Config parameter that includes one CORESET pool index value in all CORESETs for an active bandwidth part (BWP) of the scheduled cell or is not configured with a CORESET pool index value.

In some implementations, the scheduled cell may be configured by a PDCCH-Config parameter that includes two CORESET pool index values in CORESETs for an active bandwidth part (BWP) of the scheduled cell. Such implementations may further include receiving a second DCI from a second scheduling cell, and determining based on the received second DCI an association of the second DCI and a second index. In such implementations, performing cross-carrier scheduling of communications with the first TRP or the second TRP based on the DCI and the associated index may include performing cross-carrier scheduling of communications with the first TRP based on the DCI and the associated index and with the second TRP based on the second DCI and the associated second index.

In some implementations, the CIF may correspond to a first value indicating the scheduled cell, and the second DCI may include a second CIF that corresponds to a second value indicating the scheduled cell. Some implementations may further include determining that the scheduling cell is configured with two or more CORESET pool index values, and performing data communication operations for the scheduled cell according to the two or more CORESET pool index values. Some implementations may further include ignoring a CORESET pool index of the CORESET in which the DCI is received, and performing data communication operations for the scheduled cell without reference to the CORESET pool index in which the DCI is received. In some implementations, performing cross-carrier scheduling of communications with the first TRP or the second TRP based on the DCI and the associated index further may include performing data communication operations for the scheduled cell with the first TRP or the second TRP, in which the data communication operations may include at least one of Hybrid Automatic Repeat Request (HARQ)-ACK feedback, Physical Downlink Shared Channel (PDSCH) scrambling, and PDSCH rate matching.

In some implementations, determining based on the received DCI the association of the DCI and an index may include determining a CORESET pool index of the CORESET in which the DCI is received, and performing data communication operations for the scheduled cell according to the CORESET pool index of the CORESET in which the DCI is received. Some implementations may further include determining that the scheduling cell is configured by a PDCCH-Config parameter that includes two CORESET pool index values in CORESETs for an active bandwidth part (BWP) of the scheduled cell, determining the two CORESET pool index values, and performing data communication operations for the scheduled cell with the first TRP or the second TRP according to the determined two CORESET pool index values.

Some implementations may further include determining whether the scheduled cell is configured to by a PDCCH-Config parameter that includes two CORESET pool index values in CORESETs for an active BWP of the scheduled cell, ignoring a CORESET pool index in which the DCI is received in response to determining that the scheduled cell is not configured by a PDCCH-Config parameter that includes two CORESET pool index values in CORESETs for an active BWP of the scheduled cell, and performing data communication operations for the scheduled cell without reference to the CORESET pool index of the CORESET in which the DCI is received. In some implementations, the index may include a first CORESET pool index value configured for all CORESETs in the scheduling cell, and a second index may include a second CORESET pool index value configured for all CORESETs in a second scheduling cell. Such implementations may further include performing cross-carrier scheduling of communications with a first TRP according to communication link scheduling from the scheduling cell that is associated with the index and with a second TRP according to communication link scheduling from a second scheduling cell that is associated with a second index. Some implementations may further include determining that the DCI schedules the scheduled cell.

Another innovative aspect of the subject matter described in this disclosure can be implemented in an apparatus of a wireless device. Some implementations may include a first interface configured to obtain a serving cell signal from a scheduled cell, and to receive downlink control information (DCI) from the scheduling cell, and a processing system coupled to the first interface and configured to determine that a scheduled cell is configured to be scheduled by the scheduling cell, determine, based on the received DCI, an association of the DCI and an index, and initiate cross-carrier scheduling of communications with a first transmit-receive point (TRP) or a second TRP based on the DCI and the associated index.

In some implementations, the processing system may be configured such that the index includes one of the first TRP and the second TRP. In some implementations, the processing system may be further configured to determine the association of the DCI and the index based on a field in a payload of the DCI. In some implementations, the processing system may be further configured to determine an indication of the index from a field added to the payload of the DCI. In some implementations, the processing system may be further configured to determine an indication of the index from a carrier indicator field (CIF) in the DCI. In some implementations, the processing system may be configured such that the CIF indicates one of a first higher layer parameter and a second higher layer parameter, each associated with a value of the index.

Another innovative aspect of the subject matter described in this disclosure can be implemented in a non-transitory processor-readable medium having stored thereon processor-executable instructions configured to cause a wireless device processor to perform various operations, some implementations of which may include determining that a scheduled cell is configured to be scheduled by a scheduling cell, receiving downlink control information (DCI) from the scheduling cell, determining, based on the received DCI, an association of the DCI and an index, and performing cross-carrier scheduling of communications with a first transmit-receive point (TRP) or a second TRP based on the DCI and the associated index.

Another innovative aspect of the subject matter described in this disclosure can be implemented in a wireless device. Some implementations may include means for determining that a scheduled cell is configured to be scheduled by a scheduling cell, means for receiving downlink control information (DCI) from the scheduling cell, means for determining, based on the received DCI, an association of the DCI and an index, and means for performing cross-carrier scheduling of communications with a first transmit-receive point (TRP) or a second TRP based on the DCI and the associated index.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 5A shows a process flow diagram and FIGS. 5B-5I show diagrams of an example method for managing cross-carrier scheduling by a processor of a wireless device.

Like reference numbers and designations in the various drawings indicate like elements.

DETAILED DESCRIPTION

Figure 1:
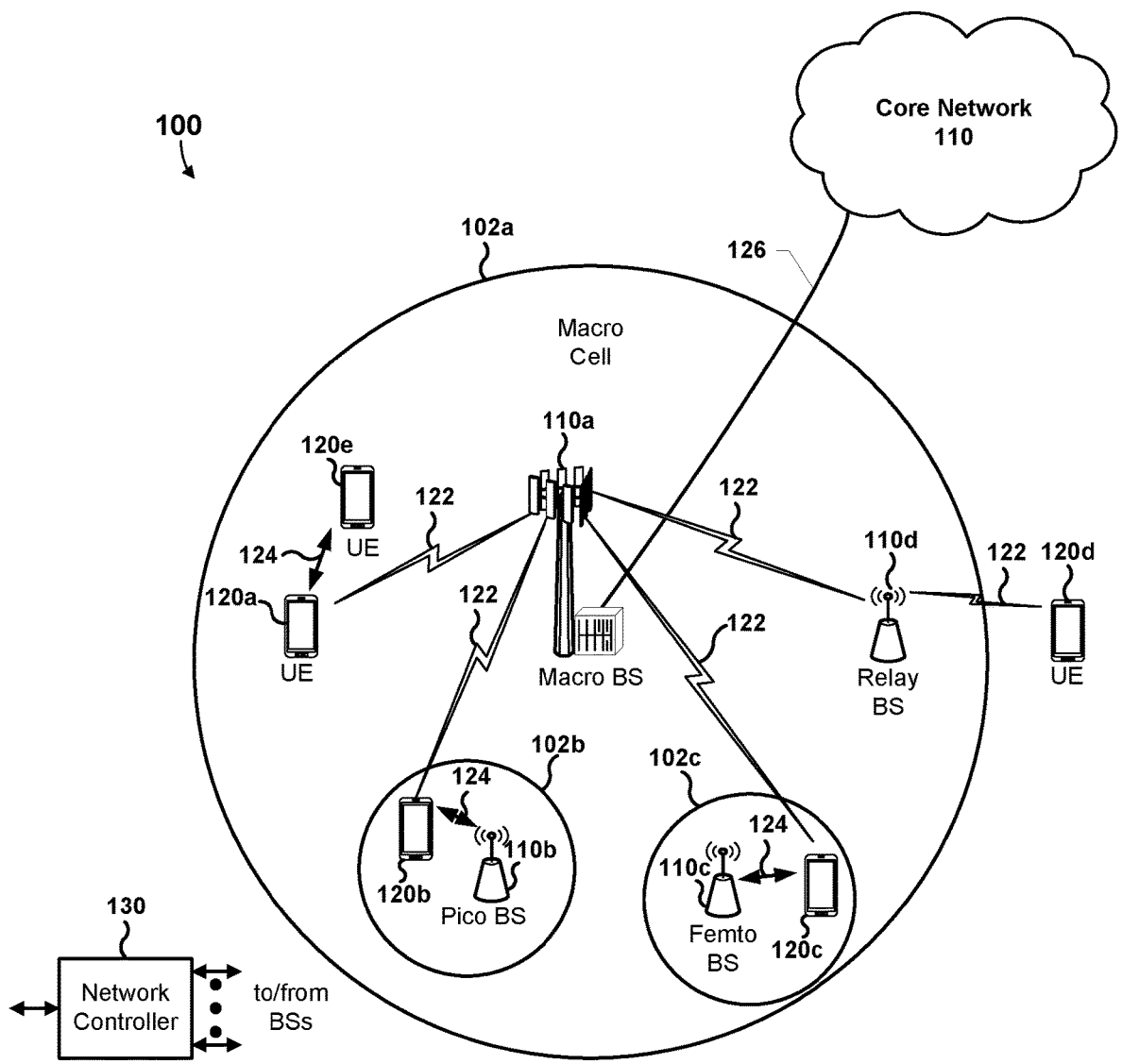
FIG. 1 shows a block diagram illustrating an example communication system.

The following description is directed to certain implementations for the purposes of describing the innovative aspects of this disclosure. However, a person having ordinary skill in the art will readily recognize that the teachings herein may be applied in a multitude of different ways.

The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

In cross-carrier scheduling, a first cell (a "scheduling cell" such as a primary cell or "PCell") may provide scheduling information in downlink control information (DCI) of a Physical Downlink Control Channel (PDCCH) for a second cell (a "scheduled cell" such as a secondary cell or "SCell"). The scheduling cell PDCCH provides DCI that schedules downlink and uplink data channels (i.e., the Physical Downlink Shared Channel (PDSCH) and Physical Uplink Shared Channel (PUSCH)) of the scheduled cell (for example, DCI format 1_1 for the scheduling of a PDSCH and DCI format 0_1 for the scheduling of a PUSCH). The scheduling cell PDCCH also includes a Carrier Indicator Field (CIF) in the DCI that identifies the scheduled serving cell or component carriers (CC) on which resources are scheduled. A number of bits for the CIF may be from 0 bits to 3 bits. When no bits for the CIF are configured (such as when no CIF bits are present, or said another way, the CIF has no presence), the lack of a CIF indicates only self-scheduling is possible. If a CIF value is set to 0, the cell performs self-scheduling and the scheduling DCI is for the same serving cell (or CC). If a CIF value is set to a non-zero value (such as an integer value of 1 to 7), the serving cell may be scheduling a scheduled cell. In some implementations, configuration may be provided as "CrossCarrierSchedulingConfig" in Radio Resource Control (RRC). In new radio (NR) Release 15, two different scheduling cells cannot schedule the same scheduled cell. In addition, a scheduled cell typically does not monitor a PDCCH when another cell schedules that cell with a corresponding CIF value.

A cell may be configured for multi-transmit-receive point ("multi-TRP" or MTRP) operation. The term "TRP" is used herein to refer to any 5G NR entity capable of transmitting and receiving signals, and may include macrocells, small cells, picocells, femtocells, remote radio heads, relay nodes, panels, RF modules in a cell, and other similar devices.

A multi-TRP operation may be defined for a given serving cell (for example, a given component carrier). A first DCI transmitted from a first TRP may schedule a first PDSCH that is transmitted from the first TRP. A second DCI transmitted from a second TRP may schedule a second PDSCH that is transmitted from the second TRP. In some implementations, to enable a wireless device to monitor the first and second DCIs transmitted from the first and second TRPs, different Control Resource Sets (CORESETs) may be used. In some implementations, a maximum permitted number of CORESETs may be 3 or more, such as for example, 3, 4, 5, etc. To enable the wireless device to differentiate TRPs based on a CORESET group, a higher layer signaling index, such as a Control Resource Set (CORESET) Pool Index (CORESETPoolIndex), may be defined per CORESET that may enable grouping of CORESETs into two groups. Each CORESET group may be indicated by a CORESET pool index value (for example, CORESETPoolIndex=0 and CORESETPoolIndex=1). In some implementations, any distinction between TRPs may be transparent to the wireless device. In some implementations, a wireless device may be configured by a higher layer parameter PDDCH-Config that contains two different values of CORESETPoolIndex in CORESETs for the active bandwidth part (BWP) of a serving cell. For example, a CORESETPoolIndex=0 may be associated with a CORESET identifier (ID) of 1 and a CORESET ID of 2, and a CORESETPoolIndex=1 may be associated with a CORESET ID of 3 and a CORESET ID of 4. In some implementations, multi-DCI based MTRP may be defined in a given serving cell (or CC) and only some serving cells (or CCs) may be configured with two values of CORESETPoolIndex.

In current networks, multi-DCI based MTRP may only be supported when a serving cell is self-scheduling. In current networks, no CORESET may be configured for a cross-carrier scheduled cell. The failure of current networks to configure a CORESET for cross-carrier scheduled cells can prevent multi-DCI based MTRP from being implemented for a cross-carrier scheduled cell in current networks. The failure of current networks to configure a CORESET for cross-carrier scheduled cells also can prevent joint Type-1 (i.e. semi-static) hybrid automatic repeat request (HARQ) acknowledgement (HARQ-ACK) from being implemented for a cross-carrier scheduled cell in current networks.

In Type-1 (i.e., semi-static) HARQ-ACK, for each CC, a set of occasions for candidate PDSCH reception are determined. For each CC, if a PDSCH is received in an occasion for candidate PDSCH reception, HARQ-ACK for the PDSCH is inserted in the corresponding place. Otherwise, a non-acknowledgement (NACK) is inserted. This is done across all configured downlink (DL) CCs. For multi-DCI and when joint feedback is configured, Type-1 (i.e., semi-static) HARQ-ACK includes defining two lists of CCs associated with the two values of CORESETPoolIndex. A CC that is configured with multi-DCI appears one time in a first list (referred to as list or set "S0") and another time in a second list (referred to as list or set "S1"). Then, the procedures for HARQ-ACK generation are done two times, once for the first set S0 and another time for the second set S1. The joint feedback is transmitted in the same physical uplink control channel (PUCCH) resource after concatenating the two codebooks (i.e., the two Type-1 HARQ-ACK codebooks) generated from the two lists (i.e., S0 and S1). As no CORESET may be configured for a cross-carrier scheduled cell in current networks, the lack of a configured CORESET prevents the proper association of the cross-carrier scheduled cell with the sets (i.e., S0 and S1) for Type-1 HARQ-ACK in current networks.

In some implementations, options for communication operations such as HARQ-ACK feedback corresponding to the PDSCHs scheduled by each TRP may be enabled. In some implementations, joint ACK-NACK feedback may be carried on the same PUCCH. In such implementations, a place of ACK-NACK bits in a joint HARQ-ACK codebook may be implemented as a function of the CORESET pool index in which the DCI scheduling the PDSCH is received. In some implementations, separate ACK-NACK feedback may be carried on the separate PUCCHs. In such implementations, if ACK-NACK feedback is transmitted in the same slot, separate codebooks may be determined based on the CORESET pool index in which the DCI scheduling the PDSCH is received.

In some implementations, the wireless device also may determine certain communication operations, such as PDSCH scrambling, or rate matching for PDSCH, based on the CORESET pool index. In some implementations, other communication operations may be determined as a function of the CORESET pool index, such as interpretation of a transmission configuration indicator (TCI) field (such as in a downlink DCI) or a sounding reference signal (SRS) resource indication (SRI) field (such as in an uplink DCI), interpretation of PUCCH resource indicator (PRI)/HARQ process number fields, and other communication operations.

In some implementations in which two PDSCHs overlap fully or partially (for example, in time or frequency), different demodulation reference signal (DMRS) ports in different code division multiplexing (CDM) groups may be used for the two PDSCHs. In such implementations, a total number of layers should not exceed a number of layers supported by a given wireless device.

In some implementations, to support multiple-PDCCH based multi-TRP/panel transmission with intra-cell (same cell ID) and inter-cell (different Cell IDs), certain RRC configurations may be used to link multiple PDCCH/PDSCH pairs with multiple TRPs. For example, one CORESET in a "PDCCH-config" may be configured to correspond to one TRP. In some implementations, for separate ACK/NACK feedback for PDSCHs received from different TRPs, the wireless device may be configured to generate separate ACK/NACK codebooks identified by an index, if the index is configured and applied across all component carriers. In some implementations, the index to be used to generate separated ACK/NACK codebook may be a higher layer signaling index per CORESET.

In some implementations, higher layer signaling indices corresponding to different ACK/NACK codebooks may have different values if the higher layer signaling index per CORESET is configured when generating separated ACK/NACK codebook across all component carriers for CCs for M-DCI based multi-TRP/panel transmission. For example, for a dynamic codebook, a counting Downlink Assignment Indicator (DAI) may be independent for DCIs from CORESETs with different values of configured higher layer signaling indices. As another example, for a semi-static codebook, determining candidate PDSCH reception occasions and HARQ-ACK information bits may be independent for DCIs/PDSCHs from CORESETs with different values of configured higher layer signaling indices. In some implementations, at least for Enhanced Mobile Broadband (eMBB) with multi-DCI non-coherent joint transmission (NCJT), in order to generate different PDSCH scrambling sequences, an RRC configuration may be enhanced to configure multiple dataScramblingIdentityPDSCHs.

To implement multi-DCI based multi-TRP communications, a determination may be made regarding whether a scheduling cell can schedule a serving cell (a scheduled cell). In some cases, the scheduling cell may not be configured to perform multi-DCI based multi-TRP communications. In some cases, two serving cells may be configured to schedule a scheduled cell. Such implementations may reflect a relaxation of standards requirements, such as the requirements of the standards of 3GPP 5G NR Release 15, but may be permitted where one scheduling DCI may schedule only a subset of layers. In some implementations, a determination may be made regarding whether the serving cell may schedule a particular scheduled cell. In some cases, the scheduled cell may not be configured to perform multi-DCI based multi-TRP communications. Further, determinations may be needed regarding how to perform various communication operations that depend on a CORESET pool index in which a DCI is received, such as HARQ-Ack feedback, PDSCH scrambling, rate matching for PDSCH, and the like.

The implementations described herein provide methods for managing wireless devices to perform multi-DCI based multi-TRP communications. In some implementations, the DCI may be configured with additional information that may be used to associated the DCI with an index, such as a higher layer index, a CORESET pool index, or a TRP, when the DCI is received and cross-carrier signaling is enabled. In some implementations, the additional information may include a separate field in the DCI. In some implementations, the additional information may be indicated as part of the CIF. For example, a value of the CIF in the scheduling cell may indicate a first TRP for a scheduled cell, and another value of the CIF in the scheduling cell may indicate a second TRP for the same scheduled cell. In some implementations, the additional information may be used for scheduled cells that are configured to perform multi-DCI based multi-TRP operations, such as to determine communication operations such as HARQ-Ack, scrambling, rate matching operations, and other suitable communication operations.

In some implementations, a scheduled cell can be scheduled by two different scheduling cells. For example, when the scheduled cell is configured to perform multi-DCI based multi-TRP operations, and the two scheduling cells schedule data channels (such as PDSCH or PUSCH) that may be associated with, different higher layer indices, different CORESET pool indexes, or different TRPs. Such implementations may reflect a relaxation of standards requirements, such as 3GPP 5G NR Release 15. In some implementations, if the scheduling cell is configured with two CORESET pool indexes, the CORESET pool index in which the DCI is received may be ignored for cross-carrier scheduling. In some implementations, the wireless device may determine communication operations based on the additional information in the DCI. In some implementations, the TRP or the CORSET group may not be needed to determine the communication operations.

In some implementations, the wireless device may use the CORESET pool index in which the DCI is received in the scheduling cell to determine the communication operations (such as HARQ-Ack, scrambling, rate matching, and the like) when the scheduled cell is configured to perform multi-DCI based multi-TRP operations. In such implementations, the DCI may not be configured with additional information. In some implementations, if the DCI is received in a CORESET with a higher layer index with a first value or a second value (such as a first or second CORESET pool index) in the scheduling cell, the wireless device may perform a communication operation associated with a first TRP or a second TRP according to the first value or the second value. In some implementations, if the scheduled cell is not configured to perform multi-DCI based multi-TRP operations, the wireless device may ignore the TRP or CORESET pool index for communication operations. In some implementations, even if the scheduling cell is not configured with two CORESET pool indexes, the CORESET pool indexes may be configured with (or associated with) a higher layer index having a first value or a second value, in which all such values belong to the first CORESET pool index or the second CORESET pool index. In such implementations, one scheduling cell alone cannot schedule both CORESET pool indexes or TRPs of the scheduled cell. In some implementations, a scheduled cell that is configured to perform multi-DCI based multi-TRP operations may be scheduled by two different scheduling cells that are configured to schedule data channels (such as PDSCH or PUSCH) associated with different indices, such as different higher layer indices, different CORESET pool indexes, or different TRPs. Such implementations may reflect a relaxation of standards requirements, such as 3GPP 5G NR Release 15.

Particular implementations of the subject matter described in this disclosure can be implemented to realize one or more of the following potential advantages. Some implementations enable a wireless device to manage cross-carrier scheduling with a scheduling cell and a scheduled cell. Cross-carrier scheduling may be useful to reduce signal interference in heterogeneous network deployments that employ carrier aggregation, especially where a heterogeneous combination of macro cells, small cells, relays, etc. is used. Cross-carrier scheduling also may be used to balance the loads from traffic and scheduling across different component carriers. In addition, cross-carrier scheduling allows the flexibility to configure the wireless device to monitor PDCCH in one or more of the component carriers while data communication can be configured for more component carriers, which in turn may reduce wireless device complexity and increase network flexibility. Furthermore, when cross-carrier scheduling techniques are combined with multi-TRP techniques, different use cases may be enabled, such as one or more component carriers in FR1 scheduling PDSCHs/PUSCHs for a component carrier in FR2, where the PDSCHs/PUSCHs are received/transmitted with different beams corresponding to the direction of the two TRPs.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (for example, ROM, RAM, Flash, etc.), and resources (for example, timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

FIG. 1 shows a block diagram illustrating an example communication system 100. The communication system 100 may be a 5G NR network, or any other suitable network such as an LTE network.

The communication system 100 may include a heterogeneous network architecture that includes a core network 140 and a variety of wireless devices (illustrated as wireless device 120a-120e in FIG. 1). The communication system 100 also may include a number of base stations (illustrated as the BS 110a, the BS 110b, the BS 110c, and the BS 110d) and other network entities. A base station is an entity that communicates with wireless devices, and also may be referred to as a NodeB, a Node B, an LTE evolved NodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP, "AP", "node B", "gNodeB", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communication system 100 through various types of backhaul interfaces, such as a direct physical connection, a virtual network, or a combination thereof using any suitable transport network.

The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communication system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with the macro base station 110a and the wireless device 120d in order to facilitate communication between the macro base station 110a and the wireless device 120d. A relay station also may be referred to as a relay base station, a relay base station, a relay, etc.

The communication system 100 may be a heterogeneous network that includes base stations of different types, for example, macro base stations, pico base stations, femto base stations, relay base stations, etc. These different types of base stations may have different transmit power levels, different coverage areas, and different impacts on interference in communication system 100. For example, macro base stations may have a high transmit power level (for example, 5 to 40 Watts), whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communication system 100, and each wireless device may be stationary or mobile. A wireless device also may be referred to as an access terminal, a terminal, a mobile station, a subscriber unit, a station, etc.

A macro base station 110a may communicate with the core network 140 over a wired or wireless communication link. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to two streams per wireless device may be supported.

Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. In some examples, a wireless device may function as a scheduling entity, scheduling resources for one or more subordinate entities (for example, one or more other wireless devices). In this example, the wireless device is functioning as a scheduling entity, and other wireless devices utilize resources scheduled by the wireless device for wireless communication. A wireless device may function as a scheduling entity in a peer-to-peer (P2P) network, in a mesh network, or another type of network. In a mesh network example, wireless devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some implementations, two or more wireless devices (for example, illustrated as the wireless device 120*a* and the wireless device 120*e*) may communicate directly using one or more sidelink channels (for example, without using a base station 110-110*d* as an intermediary to communicate with one another). For example, the wireless devices 120*a*-120*e* may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120*a*-120*e* may perform scheduling operations, resource selection operations, as well as other operations described elsewhere herein as being performed by the base station 110*a*-110*d*.

Base stations and wireless devices also may communicate over shared channels for frequency bands in which the wireless communication network does not schedule access to time-frequency resources. Referred to as unlicensed channels or unlicensed bands, multiple communication devices may transmit at any time that other devices are not using the channel/band. To avoid interfering with other wireless devices using the channel/band, a base station or wireless device follows a Listen-Before-Talk (LBT) procedure to monitor the channel/band for signals transmitted by others for a period of time, and may transmit if no other signals are detected during the LBT monitoring.

In some implementations, a base station 110*a*-110*d* or a wireless device 120*a*-120*e* may be configured to perform one or more techniques associated with a Channel Occupancy Time (COT) structure indication in an idle state or a connected state. For example, a processor in a wireless device 120*a*-120*e* may be configured to receive, from a base station 110*a*-110*d*, a set of COT structure indicators (COT-SIs) identifying a set of parameters of a COT for the wireless device, decode at least one COT-SI of the set of COT-SIs to determine at least one parameter of the set of parameters of the COT, and communicate with the base station 110*a*-110*d* in accordance with the at least one parameter or based on decoding the at least one COT-SI.

In some implementations, the wireless device 120*a*-120*e* may receive COT table configuration information. For example, the wireless device 120*a*-120*e* may receive a remaining minimum system information (RMSI) message identifying one or more small sized COT tables for use in obtaining partial COT structure information. In this case, a small sized COT table may be associated with less than a threshold size, such as less than a threshold quantity of entries, less than a threshold quantity of bits, or the like. In this case, the RMSI message may include configuration information for configuring the one or more COT tables, such as information identifying entries for the one or more COT tables, information identifying a concatenation for rows of the one or more COT tables, or the like. Additionally or alternatively, the RMSI also may include a PDCCH monitoring configuration, a DCI format for monitoring COT-SI, a size of a COT-SI PDCCH or DCI, a bit location in a DCI of information identifying a row concatenation, information identifying a quantity of bits per row index, information identifying a quantity of concatenated row indices, other bit indicators of other signaled parameters, a COT end symbol indicator, a COT pause start symbol indicator, a COT pause end symbol indicator, information relating to a triggered random access channel (RACH) procedure, CG-UL information, traffic class information, LBT information, COT acquisition information, or the like. For example, the wireless device 120*a*-120*e* may determine a control resource set (CORESET), a sub-band, a wideband, a search space set, a set of aggregation levels and corresponding number of candidates, a radio network temporary identifier (RNTI), a time domain, a monitoring periodicity, a monitoring offset, a length of a DCI, or the like for monitoring for a COT-SI, a slot format indicator (SFI) DCI, or the like. In this case, an idle mode wireless device 120*a*-120*e* may be able to decode COT-SI bits to indicate one or more ordered entries of a first COT table and a second COT table, as described in more detail herein. In contrast, a connected mode wireless device 120*a*-120*e* may be able to decode COT-SI bits for the first COT table, the second COT table, and the third COT table.

Additionally, or alternatively, the wireless device 120*a*-120*e* may determine other information regarding a COT structure. For example, when operating in an unlicensed band, the wireless device 120*a*-120*e* may determine a COT duration. Additionally, or alternatively, the wireless device 120*a*-120*e* may determine a concatenation of one or more rows of a COT table, a CG-UL behavior, or the like, as described in more detail herein.

In some implementations, the wireless device 120*a*-120*e* may receive and decode a set of COT-SIs. For example, the wireless device 120*a*-120*e* may receive a first COT-SI identifying an index value for a first COT table, a second COT-SI identifying an index value for a second COT table, a third COT-SI identifying an index value for a third COT table, or the like. In this case, the COT-SIs may be bit indicators of a DCI received when monitoring for a PDCCH. In some implementations, the wireless device 120*a*-120*e* may determine one or more parameters for communicating with the BS 110a-110d based on the set of COT-SIs. For example, wireless device 120a-120e may determine an LBT type based on whether a transmit occasion is inside or outside of an acquired COT. In another example, the COT-SI may trigger or enable a RACH occasion within the acquired COT for an idle mode wireless device 120a-120e to transmit a RACH. In some implementations, the first COT-SI may include information identifying a COT end symbol, a COT duration (which may be implemented as a remaining COT duration indicator), a first COT pause start symbol, a first COT pause end symbol, a second COT pause start symbol, a second COT pause end symbol, or the like. In this case, the first COT-SI may explicitly identify a remaining COT duration and a COT pause indicator in a DCI. In some cases, information identifying symbol locations, such as a COT end symbol identifier, first COT pause start symbol identifier, a first COT pause end symbol identifier, a second COT pause start symbol identifier, a second COT pause end symbol identifier, or the like, may be indicated as an offset from a current position.

In some implementations, the wireless device 120a-120e may receive and decode a set of COT-SIs based on a state of the wireless device. For example, an idle mode wireless device 120a-120e may decode COT-SIs for the first COT table and the second COT table and a connected mode wireless device 120a-120e may decode COT-SIs for the first COT table, the second COT table, and the third COT table. In some implementations, the wireless device 120a-120e may receive the COT-SIs via a single PDCCH. For example, the wireless device 120a-120e may receive multiple bit indicators in a single PDCCH for multiple COT tables. Additionally, or alternatively, the wireless device 120a-120e may receive the multiple bit indicators via multiple PDCCHs associated with different frequency resources, time resources, monitoring periodicities, monitoring configurations, or the like.

In some implementations, the COT-SIs and the corresponding COT tables may be arranged hierarchically. For example, the wireless device 120a-120e may receive multiple indicators relating to multiple COT tables, such as a set of three COT tables. In this case, the wireless device 120a-120e may receive increasing amounts of information regarding the COT structure as additional resources are available, rather than using a relatively large single resource to signal all information regarding the COT structure.

In some implementations, the wireless device 120a-120e may receive multiple COT tables in different incremental stages. For example, a wireless device may receive the first COT table and the second COT table through an RMSI and may receive the third COT table after connecting and via a wireless device specific RRC message. In another example, the first COT table may be stored, and the wireless device 120a-120e may receive a first part of the third COT table in the RMSI and a second part of the third COT table in a wireless device specific RRC after connecting. In this case, the first part of the third COT table may be the second COT table.

In some implementations, the wireless device 120a-120e may determine a particular set of information regarding the COT structure based on the first COT table. For example, with regard to the first COT table, the wireless device 120a-120e may determine whether each symbol in a slot is inside a COT or outside a COT without indicating whether a symbol is for UL or DL. In this case, a quantity of rows and entries of the first COT table may be relatively short, such as a set of 8 rows and a set of 14 columns, since the first COT table is configured through the RMSI which may be limited in size; however, the wireless device 120a-120e may receive an indicator via a DCI to concatenate a set of row indices. In this way, the wireless device 120a-120e is enabled to receive a single COT-SI index for the first COT table that identifies a COT structure for multiple upcoming slots. As another example, the first COT table may indicate, via a single row, whether multiple slots or symbols are inside a COT or outside a COT.

In some implementations, the wireless device 120a-120e may combine the COT-SI information regarding the first COT table with other COT information received with the COT-SI or separate from the COT-SI to determine a COT structure. For example, the wireless device 120a-120e may receive a COT duration indicator (which may be indicated using a remaining COT duration indicator), a COT pause indicator, or the like in a DCI to combine with information regarding whether a particular symbol or slot is inside a COT or outside a COT. In some implementations, the COT pause indicator may indicate a start of a COT pause, a length of a COT pause, an end of a COT pause, or the like. In some implementations, the COT pause indicator may use a particular identifier. For example, the wireless device 120a-120e may interpret an outside COT indication ("O" or "Out") disposed between multiple inside COT indications ("I's" or "In's") as a COT pause indicator. Additionally, or alternatively, the wireless device 120a-120e may receive an explicit COT pause indicator (which could be represented as "P" or "Pause"), a COT start symbol and end symbol identifier from which the wireless device 120a-120e can derive the COT pause, or the like.

In some implementations, the wireless device 120a-120e may receive a first COT-SI that explicitly includes a COT end symbol or a COT duration indicator (which may be a remaining COT duration indicator), a COT pause start symbol, and a COT end symbol. In this case, the wireless device 120a-120e may not receive the first COT table.

Additionally, or alternatively, with regard to a second COT table, the wireless device 120a-120e may determine whether a slot is assigned for downlink ("D"), assigned for uplink ("U"), flexibly assigned ("F"), included in a COT pause ("O" or "P"), or the like. In this case, the second COT table provides partial slot information, such as providing one of a slot level indication, a mini-slot level indication, a symbol-group level indication, or the like, rather than multiple levels of indication, thereby reducing resource utilization. In some implementations, the second COT table may identify a slot assignment for multiple slots with each index, but less than an entirety of a COT. In this case, the wireless device 120a-120e may receive a COT-SI DCI to concatenate multiple row indices to enable signaling of a greater portion of a COT or the entirety of the COT.

In some implementations, the second COT table may be a truncation of the third COT table. For example, the second COT table may include a subset of rows of the third COT table, such as the first one or more rows. In this way, a size limit for tables configured through RMSI may be observed. In some implementations, the wireless device 120a-120e may receive a COT-SI DCI for the second COT table that identifies a row that is not included in the second COT table, such as an index greater than a greatest index of the second COT table. In this case, the wireless device 120a-120e may determine that a set of slots are associated with a default configured assignment, such as an unknown assignment, and the wireless device may communicate in accordance with the default configured assignment. As another example, each row in the second COT table may include information identifying a length of a COT duration, a quantity of DL slots, a quantity of DL symbols, a quantity of flexible symbols, a quantity of UL symbols, a quantity of UL slots, or the like.

Additionally, or alternatively, with regard to a third COT table, the wireless device 120a-120e may determine an entirety of a COT structure at a symbol level. For example, the third COT table may include information identifying whether each symbol is assigned as a DL symbol, an UL symbol, a flexible symbol, or the like. In some implementations, the third COT table may be a slot format combination table that identifies a slot format for symbols of an indicated quantity of consecutive slots. In some implementations, information derived from the third COT table may override information derived from the second COT table. For example, when a symbol is identified as flexibly assigned based on the second COT table, the wireless device 120a-120e may determine that the flexible assignment is to be an UL assignment based on the third COT table.

In some implementations, the wireless device 120a-120e may receive other information in connection with the COT-SIs. For example, the wireless device 120a-120e may receive information identifying a size of a DCI, information identifying a position of bits identifying COT table indices within a DCI, a quantity of concatenated rows of a COT table, or the like. Additionally or alternatively, the wireless device 120a-120e may receive information identifying a current location with respect to a start of a COT, a traffic priority class of the COT, whether the base station 110a-110d or another wireless device 120a-120e acquired the COT, a dynamically triggered physical RACH (PRACH) resource information, a dynamically triggered PRACH enable or trigger message, LBT type for the COT, a CG-UL parameter, a two-stage grant resource and triggering information, or the like.

In some implementations, the wireless device 120a-120e may determine a particular CG-UL behavior based on the CG-UL parameter. For example, the wireless device 120a-120e may determine that CG-UL is allowed if a category type 4 LBT procedure is configured and a COT start is not yet detected. Additionally, or alternatively, when a COT start is detected but a COT-SI is not yet received, is not yet processed, or the like, the wireless device 120a-120e may cancel a CG-UL. Additionally, or alternatively, the wireless device 120a-120e may avoid canceling the CG-UL if a scheduled grant is not detected. Additionally, or alternatively, when at a time inside a COT and a COT-SI is detected and processed by the wireless device 120a-120e, the wireless device may cancel the CG-UL when a slot is assigned for DL. Additionally, or alternatively, the wireless device 120a-120e may refrain from canceling the CG-UL when the slot is assigned for UL, and may observe a signaled behavior associated with the CG-UL parameter when the slot is assigned as flexible slot.

In some implementations, rather than receiving a COT-SI, the wireless device 120a-120e may receive an explicit SFI for each slot of a COT. For example, the wireless device 120a-120e may receive a DCI conveying the explicit SFI that indicates a slot format for an entirety of the COT based on a stored table associated with an unlicensed spectrum frame structure. Based on the stored table being smaller than a slot format combination table, such as based on the unlicensed spectrum being associated with a maximum COT size of less than a threshold, a quantity of bits in the DCI to signal the COT structure is reduced. In this case, the wireless device 120a-120e may determine that the DCI conveys an explicit SFI based on a bit indicator in the DCI indicating that the DCI conveys the explicit SFI rather than one or more COT-SIs. In some implementations, the DCI may signal a COT table that includes a symbol representing slots that are not within a COT. In some implementations, the DCI may include an explicit COT duration indicator to enable the wireless device 120a-120e to determine the length of the COT.

In some implementations, the wireless device 120a-120e may decode one or more COT-SIs and may communicate in accordance with a COT structure identified by the one or more COT-SIs. Each COT-SI may include information about the TXOP, such as the remaining COT duration, start and length of pauses inside the TXOP, DL or UL slot indications of the slots in TXOP, sub-band usage indication of the TXOP, etc.

Figure 2:
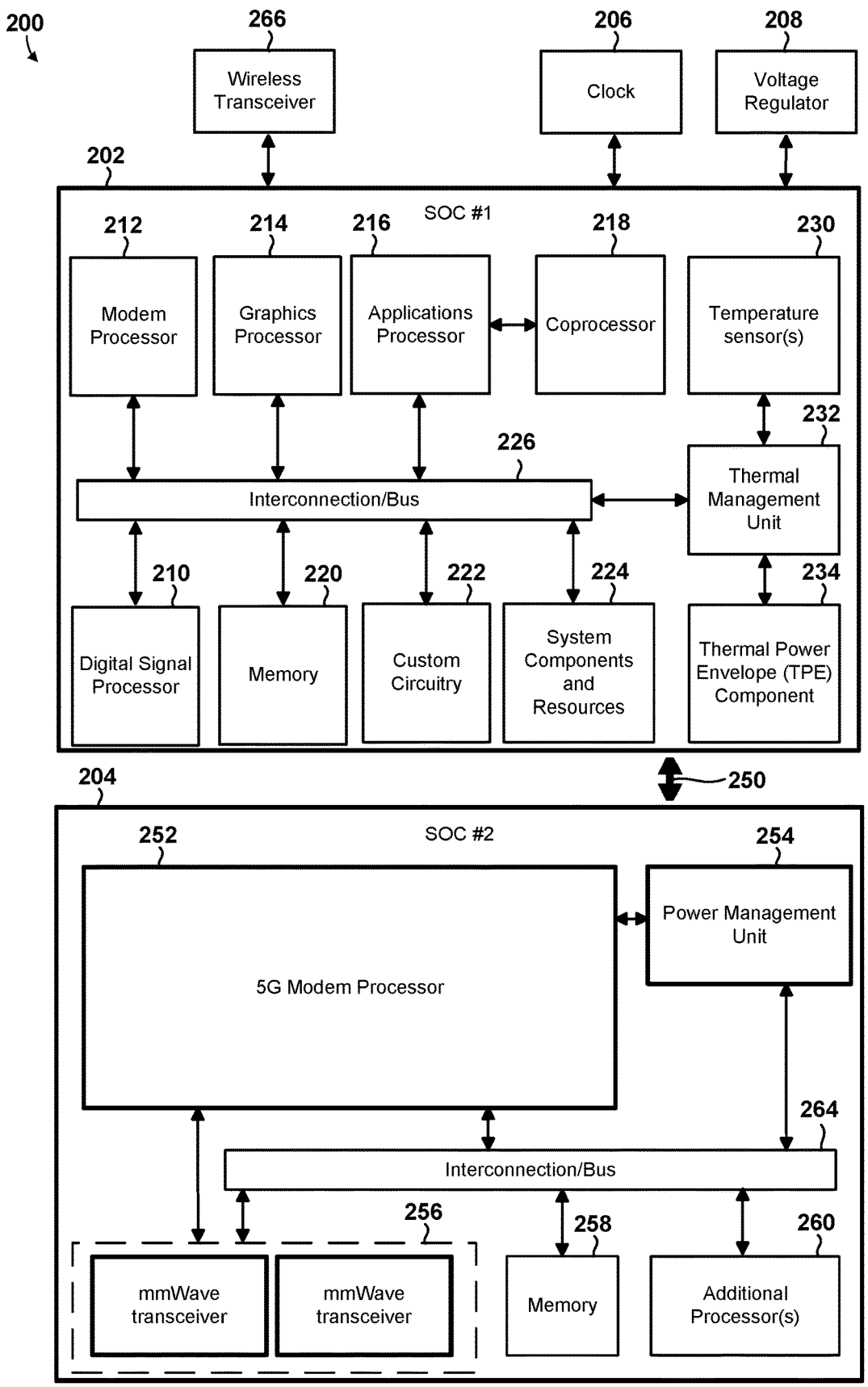
FIG. 2 shows a component block diagram of an example computing system.

FIG. 2 shows a component block diagram of an example computing system 200. With reference to FIGS. 1 and 2, the computing system 200 may be implemented on a number of single processor and multiprocessor computer systems, including a system-on-chip (SOC) or system in a package (SIP). The computing system 200 may include two SOCs 202, 204, coupled to a clock 206, a voltage regulator 208, and a wireless transceiver 266 configured to send and receive wireless communications via an antenna (not shown) to/from wireless devices, such as a base station 110a. In some implementations, the first SOC 202 operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wavelength (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuity 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
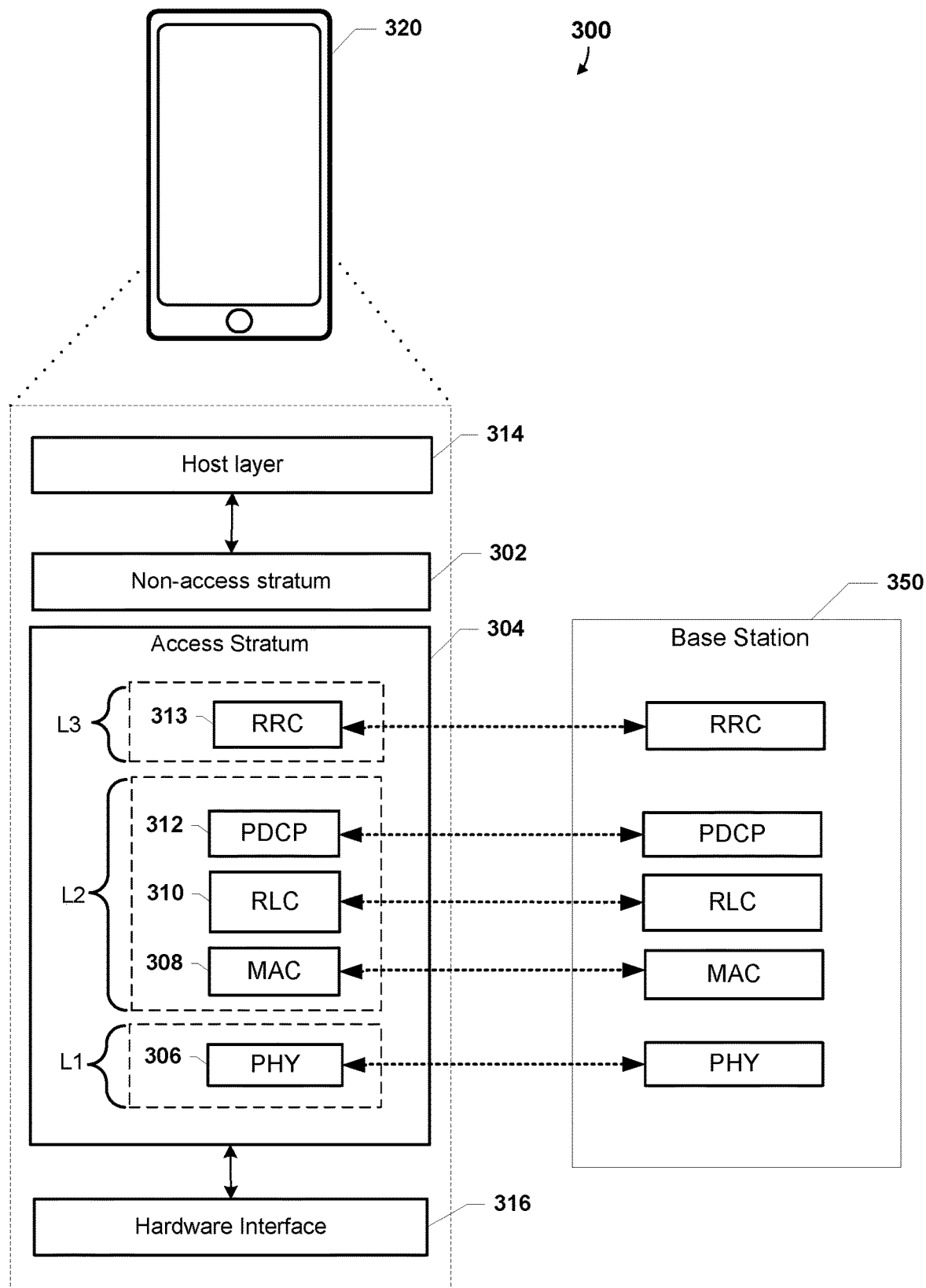
FIG. 3 shows a component block diagram of an example software architecture including a radio protocol stack for the user and control planes in wireless communications.

FIG. 3 shows a component block diagram of an example software architecture 300 including a radio protocol stack for the user and control planes in wireless communications. With reference to FIGS. 1-3, the software architecture 300 may include a radio protocol stack for the user and control planes in wireless communications between a base station 350 (such as the base station 110a-110d) and a wireless device 320 (such as the wireless device 120a-120e, 200). The wireless device 320 may implement the software architecture 300 to communicate with the base station 350 of a communication system (such as the communication system 100). In some implementations, layers in software architecture 300 may form logical connections with corresponding layers in software of the base station 350. The software architecture 300 may be distributed among one or more processors (such as the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols for wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 110. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (for example, 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In some other implementations, the software architecture 300 may include one or more higher logical layer (such as transport, session, presentation, application, etc.) that provide host layer functions. For example, in some implementations, the software architecture 300 may include a network layer (such as an Internet Protocol (IP) layer) in which a logical connection terminates at a packet data network (PDN) gateway (PGW). In some implementations, the software architecture 300 may include an application layer in which a logical connection terminates at another device (such as an end user device, server, etc.). In some implementations, the software architecture 300 may further include in the AS 304 a hardware interface 316 between the physical layer 306 and the communication hardware (such as one or more radio frequency (RF) transceivers).

Figure 4:
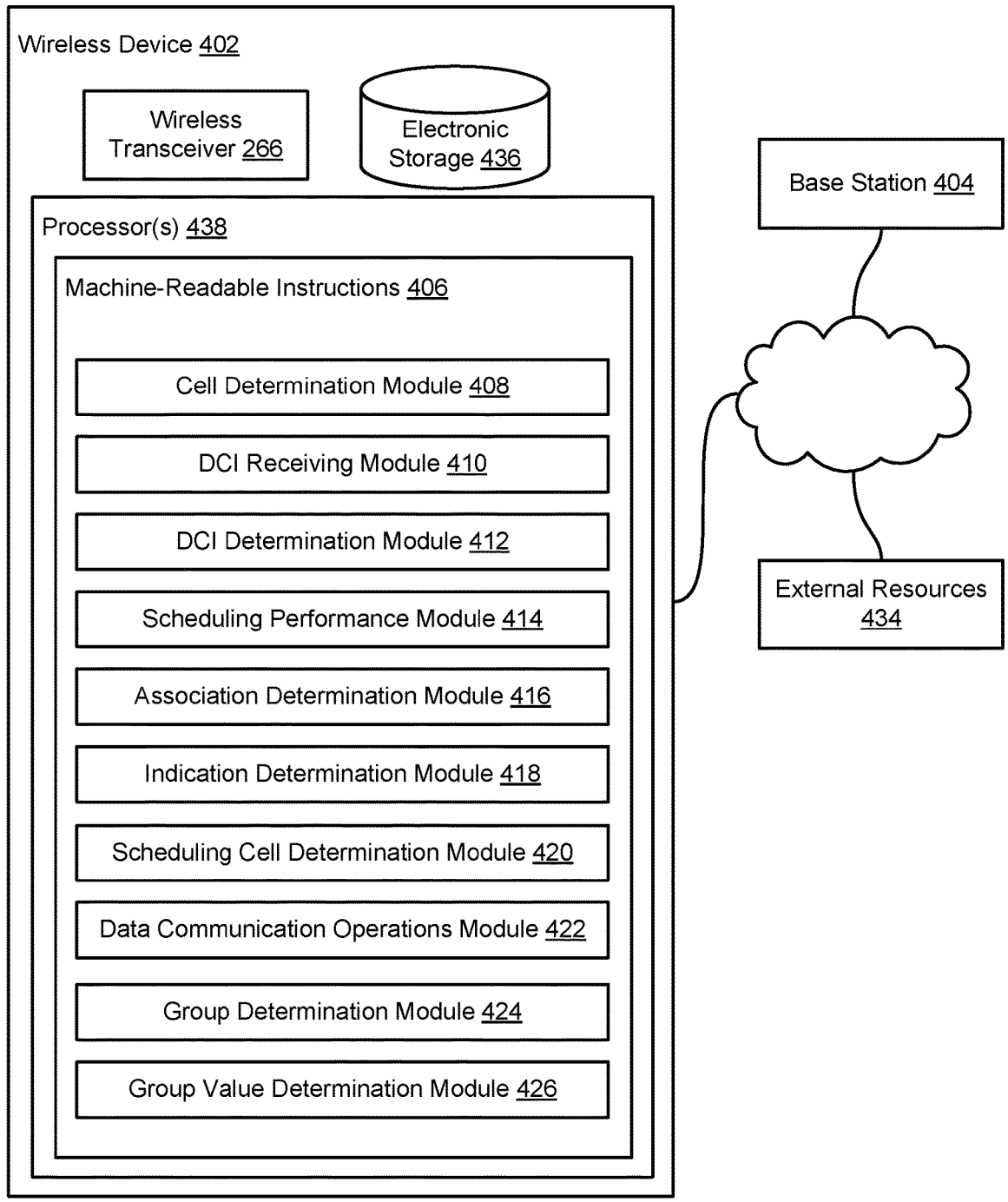
FIG. 4 shows a component block diagram of an example system configured for managing paging monitoring by a processor of a wireless device.

FIG. 4 shows a component block diagram of an example system 400 configured for managing paging monitoring by a processor of a wireless device. With reference to FIGS. 1-4, in some implementations, the system 400 may include a wireless device 402 (for example, the wireless device 120a-120e, 200, 320) and a base station 404 (for example, the base station 110a-110d, 350).

The wireless device 402 may include one or more processors 428 coupled to electronic storage 426 and a wireless transceiver 266. The wireless transceiver 266 may be configured to receive messages to be sent in uplink transmissions from the one or more processors 438, and to transmit such messages via an antenna (not shown) to a wireless communication network via the base station 404. Similarly, the wireless transceiver 266 may be configured to receive messages from the base station 404 and pass the messages (such as via a modem that demodulates the messages) to the one or more processors 438. The wireless device 402 may be configured by machine-readable instructions 406. Machine-readable instructions 406 may include one or more instruction modules. The instruction modules may include computer program modules. The instruction modules may include one or more of a cell determination module 408, a DCI receiving module 410, a DCI determination module 412, scheduling performance module 414, an association determination module 416, an indication determination module 418, a scheduling cell determination module 420, a data communication operation performance module 422, a group determination module 424, group value determination module 426, or other instruction modules.

The cell determination module 408 may be configured to determine whether a scheduling cell or a scheduled cell is configured to perform multi-DCI based multi-TRP communication.

The DCI receiving module 410 may be configured to receive downlink control information from a scheduling cell. For example, the DCI may be received in or extracted from a PDCCH.

The DCI determination module 412 may be configured to determine based on the received DCI an association of the DCI and an index. In some implementations, the index may include a CORESET pool index. In some implementations, the index may include one of the first TRP and the second TRP. In some implementations, each CORESET or TRP may be associated with a value of the index.

The scheduling performance module 414 may be configured to perform cross-carrier scheduling of communications with the first TRP or the second TRP based on the DCI and the associated index. In some implementations, the scheduling performance module 414 may be configured to perform cross-carrier scheduling of communications with the first TRP and the second TRP based on the determined index. In some implementations, the scheduling performance module 414 may be configured to perform cross-carrier scheduling of communications with the first TRP based on the DCI and the associated index and with the second TRP based on the second DCI and the associated second index. In some implementations, the scheduling performance module 414 may be configured to perform cross-carrier scheduling of communications with the first TRP and the second TRP based on the higher layer index value of the CORESET pool index. In some implementations, the scheduling performance module 414 may be configured to perform cross-carrier scheduling of communications with the first TRP according to communication link scheduling from the scheduling cell that is associated with the index and with the second TRP according to communication link scheduling from a second scheduling cell that is associated with a second index.

The association determination module 416 may be configured to determine the association of the DCI and the index based on a field in a payload of the DCI.

The indication determination module 418 may be configured to determine an indication of the index from a field added to the payload of the DCI. In some implementations, the indication determination module 418 may be configured to determine an indication of the index from a CIF in the DCI. In some implementations, the indication determination module 418 may be configured to determine whether the CIF corresponds to a value indicating a scheduled cell.

The scheduling cell determination module 420 may be configured to determine whether the scheduling cell is configured with two or more CORESET pool indexes. The scheduling cell determination module 420 may be configured to determine whether the scheduling cell is configured to perform multi-DCI based multi-TRP operations.

The data communication operations module 422 may be configured to perform data communication operations according to the index. In some implementations, the data communication operations module 422 may be configured to perform data communication operations with the first TRP or the second tip. By way of non-limiting example, data communication operations may include at least one of HARQ-ACK feedback, PDSCH scrambling, and PDSCH rate matching.

In some implementations, the data communication operations module 422 may be configured to perform data communication operations according to the CORESET pool index in which the DCI is received. In some implementations, the data communication operations module 422 may be configured to perform data communication operations for the scheduled cell with the first TRP or the second TRP according to the determined CORESET pool index value. In some implementations, the data communication operations module 422 may be configured to perform data communication operations without reference to the CORESET pool index in which the DCI is received.

The group determination module 424 may be configured to determine a CORESET pool index in which the DCI is received. The group value determination module 426 may be configured to determine a CORESET pool index value associated with each of the two CORESET pool indexes.

The wireless device 402 may include an electronic storage 436, one or more processors 438, and other components. The wireless device 402 may include communication lines, or ports to enable the exchange of information with a network or other computing platforms. The illustration of the wireless device 402 in FIG. 4 is not intended to be limiting. The wireless device 402 may include a plurality of hardware, software, or firmware components operating together to provide the functionality attributed herein to the wireless device 402.

The electronic storage 436 may include non-transitory storage media that electronically stores information. The electronic storage media of the electronic storage 436 may include one or both of system storage that is provided integrally (i.e., substantially non-removable) with wireless device 402 or removable storage that is removably connectable to wireless device 402 via, for example, a port (such as a universal serial bus (USB) port, a firewire port, etc.) or a drive (such as a disk drive, etc.). The electronic storage 436 may include one or more of optically readable storage media (such as optical disks, etc.), magnetically readable storage media (such as magnetic tape, magnetic hard drive, floppy drive, etc.), electrical charge-based storage media (such as EEPROM, RAM, etc.), solid-state storage media (such as flash drive, etc.), or other electronically readable storage media. Electronic storage 436 may include one or more virtual storage resources (such as cloud storage, a virtual private network, or other virtual storage resources). The electronic storage 436 may store software algorithms, information determined by processor(s) 438, information received from wireless device 402, or other information that enables the wireless device 402 to function as described herein.

Processor(s) 438 may be configured to provide information processing capabilities in the wireless device 402. As such, processor(s) 438 may include one or more of a digital processor, an analog processor, a digital circuit designed to process information, an analog circuit designed to process information, a state machine, or other mechanisms for electronically processing information. Although processor(s) 438 is shown in FIG. 4 as a single entity, this is for illustrative purposes only. In some implementations, processor(s) 438 may include a plurality of processing units. These processing units may be physically located within the same device, or processor(s) 438 may represent processing functionality of a plurality of devices operating in coordination. Processor(s) 438 may be configured to execute modules 408-426, or other modules. Processor(s) 438 may be configured to execute modules 408-426, or other modules by software; hardware; firmware; some combination of software, hardware, or firmware; or other mechanisms for configuring processing capabilities on the processor(s) 438. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-426 described below is for illustrative purposes, and is not intended to be limiting, as any of the modules 408-426 may provide more or less functionality than is described. For example, one or more of modules 408-426 may be eliminated, and some or all of its functionality may be provided by other ones of the modules 408-426. As another example, processor(s) 438 may be configured to execute one or more additional modules that may perform some or all of the functionality attributed below to one of the modules 408-426.

Figure 5A:
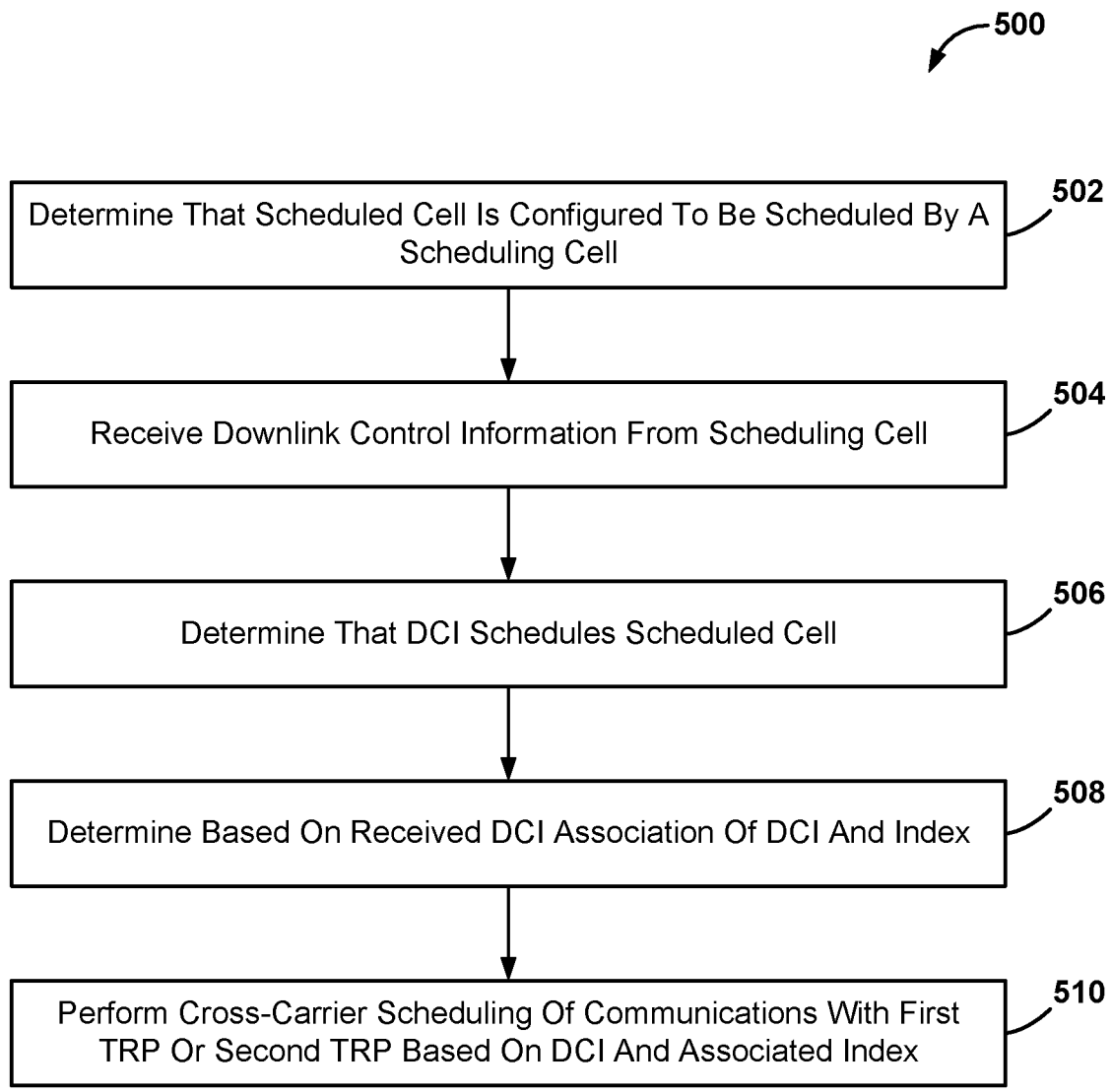

FIG. 5A shows a process flow diagram and FIGS. 5B-5I show diagrams of an example method 500 for managing cross-carrier scheduling by a processor of a wireless device.

With reference to FIGS. 1-5I, the method 500 may be implemented by a processor (such as 212, 216, 252 or 260) of a wireless device (such as the wireless device 120a-120e, 200, 320).

In block 502, the processor may determine that a scheduled cell is configured to be scheduled by a scheduling cell. In some implementations, the processor may obtain or receive a serving cell signal from a scheduled cell.

In block 504, the processor may receive downlink control information (DCI) from the scheduling cell. In some implementations, the scheduling cell may be configured to perform multi-DCI based multi-TRP communications. In some implementations, the scheduling cell may not be configured to perform multi-DCI based multi-TRP communications. In some implementations, the scheduling cell may be configured by a parameter PDCCH-Config that includes two (possibly different) CORESET pool index values in CORESETs for an active bandwidth part (BWP) of the serving cell. In some implementations, the scheduled cell may be configured to perform multi-PDSCH multi-TRP communications.

In block 506, the processor may determine that the DCI schedules the scheduled cell.

In block 508, the processor may determine based on the received DCI an association of the downlink control information and an index. In some implementations, the index may include a CORESET pool index. In some implementations, the index may include one or a first TRP and a second TRP.

In block 510, the processor may perform cross-carrier scheduling of communications with the first TRP or the second TRP based on the DCI and the associated index. In some implementations, the processor may initiate cross-carrier scheduling of communications with the first TRP or the second TRP based on the DCI and the associated index. In some implementations, performing cross-carrier scheduling of communications with the first TRP or the second TRP based on the DCI and the associated index further may include performing data communication operations for the scheduled cell with the first TRP or the second TRP, in which the data communication operations include at least one of Hybrid Automatic Repeat Request (HARQ)-ACK feedback, Physical Downlink Shared Channel (PDSCH) scrambling, and PDSCH rate matching.

In some implementations, the scheduling cell may be configured by a PDCCH-Config parameter that includes two CORESET pool index values in CORESETs for an active bandwidth part (BWP) of the serving cell. In some implementations, the scheduled cell may be configured to perform multi-PDSCH multi-TRP communications. In some implementations, the scheduling cell may be configured by a PDCCH-Config parameter that includes one CORESET pool index value in all CORESETs for an active bandwidth part (BWP) of the scheduled cell or may not be configured with a CORESET pool index value.

The method 500 may be implemented in a variety of scenarios. For example, with reference to FIG. 5B, a scheduling cell and a scheduled cell may each be configured by a PDCCH-Config parameter that includes two CORESET pool index values in CORESETs (such as a first CORESET pool index value and a second CORESET pool index value) for an active bandwidth part (BWP) of the scheduled cell. In some implementations, the scheduling cell may be configured to perform multi-DCI based multi-TRP operations, in which some CORESETs may be associated with a first CORESET pool index value while other CORESETs may be associated with a second CORESET pool index value. In some implementations, the scheduled cell may be configured to perform multi-PDSCH (or multi-PUSCH) multi-TRP operations.

As another example, with reference to FIG. 5C, a scheduling cell may be configured to perform multi-DCI based multi-TRP operations, in which some CORESETs may be associated with a first CORESET pool index value while other CORESETs may be associated with a second CORESET pool index value. A scheduled cell may not be configured to perform multi-PDSCH (or multi-PUSCH) multi-TRP operations.

As another example, with reference to FIG. 5D, a scheduling cell may not be configured to perform multi-DCI based multi-TRP operations, in which one or more CORESETs are not associated with a CORESET pool index value, or all CORESETs are associated with the same CORESET pool index value. A scheduled cell may be configured to perform multi-PDSCH (or multi-PUSCH) multi-TRP operations.

Figure 5E:
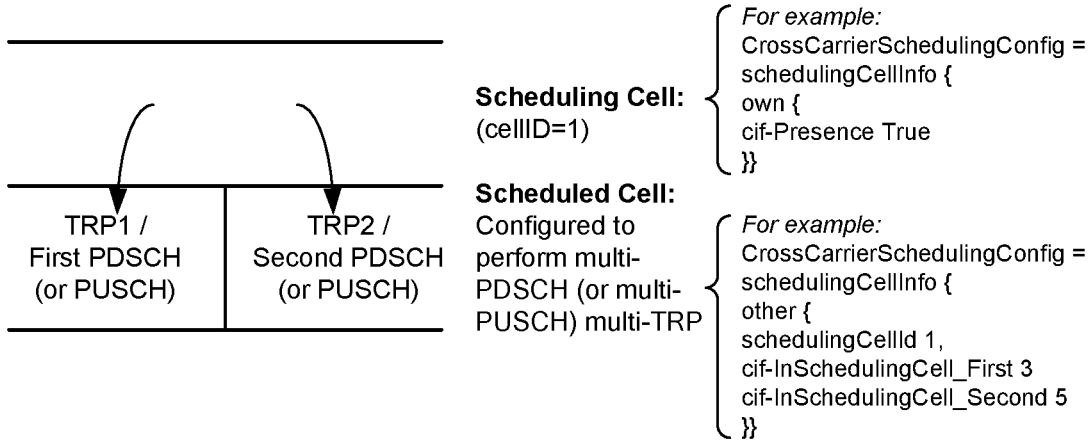

With reference to FIG. 5E, in some implementations, one scheduling cell may be configured to schedule (that is, to provide scheduling information to) a scheduled cell that is configured to perform multi-PDSCH (or multi-PUSCH) multi-TRP operations. In some implementations, the scheduling cell may be configured to perform multi-DCI based multi-TRP operations. In some implementations, the scheduling cell may not be configured to perform multi-DCI based multi-TRP operations. For example, as part of the cross-carrier configuration, the scheduled cell may be configured to be scheduled from a scheduling cell with Cell ID=1. In addition, two CIF values may be provided as part of the cross-carrier configuration. The first CIF value (corresponding to the first TRP or the first index) may be equal to the value of 3, and the second CIF value (corresponding to the second TRP or the second index) may be equal to the value of 5. Once the user equipment (UE) is configured with such cross-carrier configurations, the UE can determine an association between a DCI received in the scheduling cell and the index (such as a TRP) in the scheduled cell based of the value of CIF. For example, if the CIF in the DCI in the scheduling cell is equal to 3, it is associated with the first TRP in that scheduled cell, and if it is equal to 5, it is associated with the second TRP in that scheduled cell.

Figure 5F:
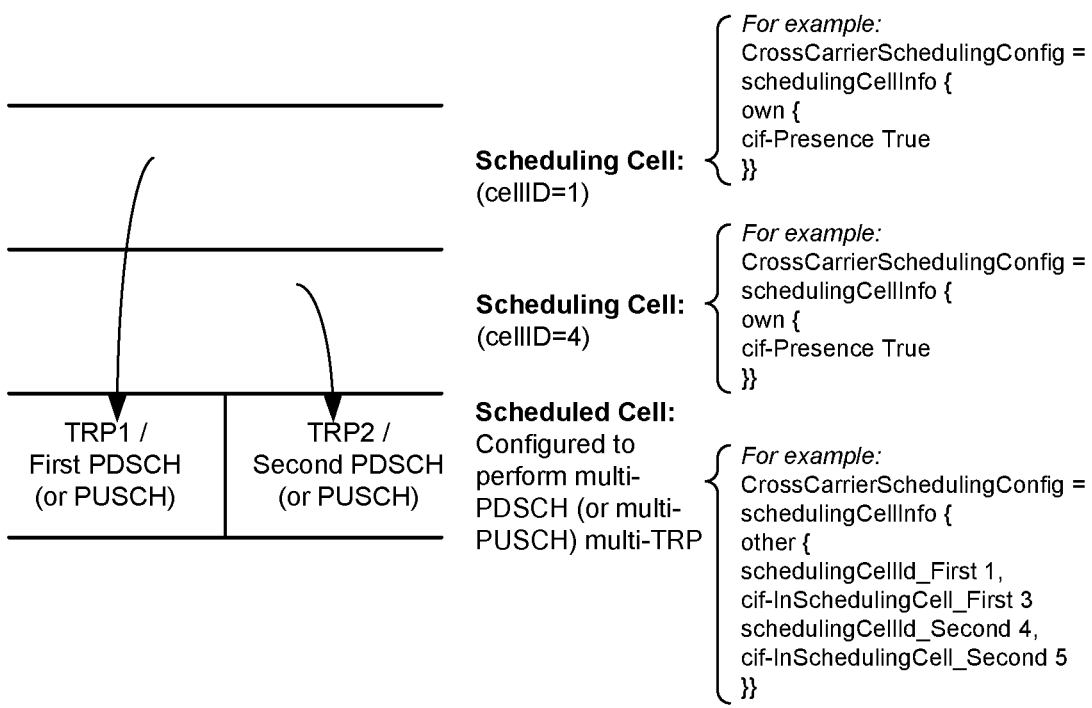

With reference to FIG. 5F, in some implementations, two scheduling cells, each configured with a different cell ID, may be configured to schedule a scheduled cell that is configured to perform multi-PDSCH (or multi-PUSCH) based multi-TRP operations. In this case, cross-carrier configuration in the scheduled cell may consist of two cell IDs as scheduling cells with corresponding CIF values included in the configuration. In this example, the DCI received in cell ID=1 (with CIF value of 3) is associated with the first TRP in the scheduled cell, and the DCI received in cell ID=4 (with CIF value of 5) is associated with the second TRP.

Figure 5G:
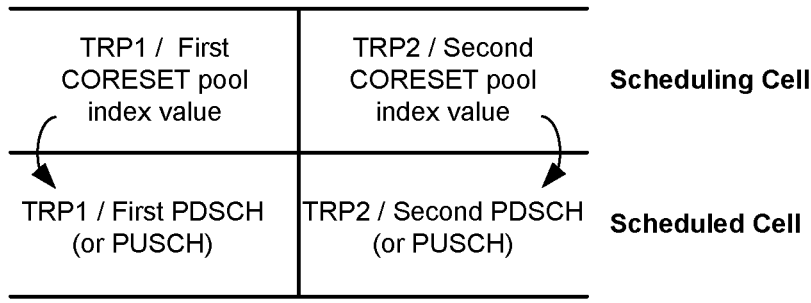

With reference to FIG. 5G, in some implementations, a scheduling cell that is configured with two TRPs or CORESET pool indexes may be configured to schedule a scheduled cell that is configured to perform multi-PDSCH (or multi-PUSCH) based multi-TRP. The arrows indicate an association of a CORESET pool index in the scheduling cell and an index or TRP in the scheduled cell.

Figure 5H:
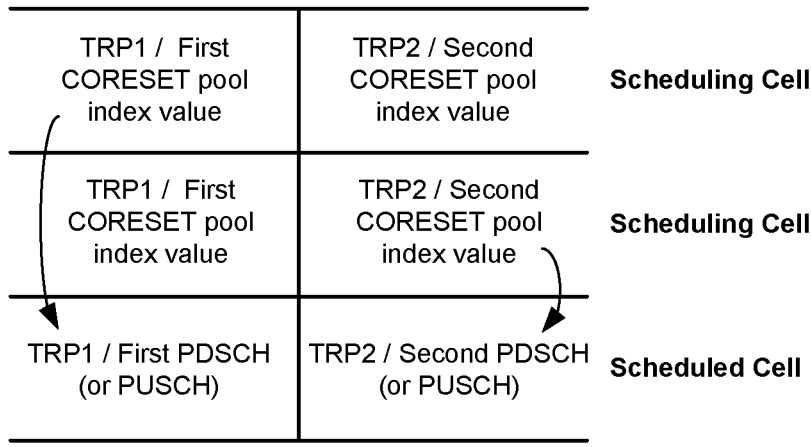

With reference to FIG. 5H, in some implementations, two scheduling cell that are each configured with two TRPs or CORESET pool indexes may be configured to schedule a scheduled cell that is configured to perform multi-PDSCH (or multi-PUSCH) based multi-TRP. The arrows indicate an association of a CORESET pool index in a respective scheduling cell and an index or TRP in the scheduled cell.

Figure 5I:
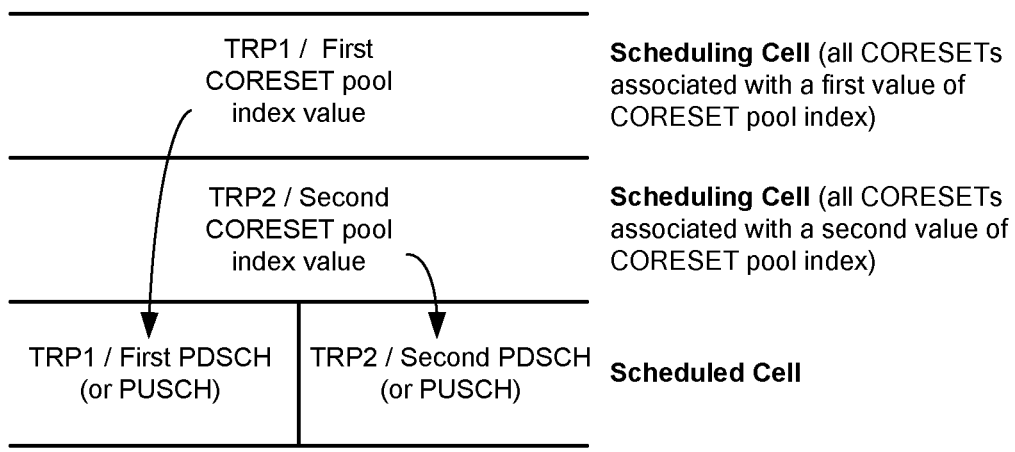

With reference to FIG. 5I, in some implementations, two scheduling cells that are each configured with a different TRP or CORESET pool index may be configured to schedule a scheduled cell that is configured to perform multi-PDSCH (or multi-PUSCH) based multi-TRP. In some implementations, in the first scheduling cell, all CORESETS may be associated with a first value of a CORESET pool index, and in the second scheduling cell, all CORESETS may be associated with a second value of a CORESET pool index. The arrows indicate an association of a CORESET pool index in a respective scheduling cell and an index or TRP in the scheduled cell.

FIGS. 6A-6J show process flow diagrams of example operations that may be performed as part of the method 500 for managing cross-carrier scheduling by a processor of a wireless device. With reference to FIGS. 1-6J, the example operations may be implemented by a processor of a wireless device (such as the wireless device 120a-120e, 200, 320).

Figure 6A:
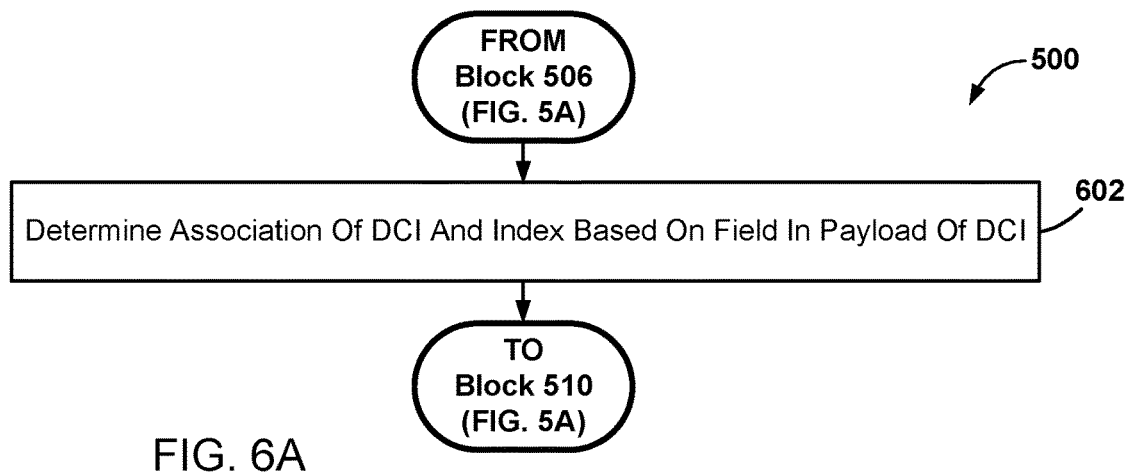
FIGS. 6A-6J show process flow diagrams of example operations that may be performed as part of the method for managing cross-carrier scheduling by a processor of a wireless device.

Referring to FIG. 6A, in some implementations following the operations of block 506 (FIG. 5A), the processor may determine the association of the DCI and the index based on a field in a payload of the DCI in block 602

The processor may then perform the operations of block 510 (FIG. 5A).

Figure 6B:
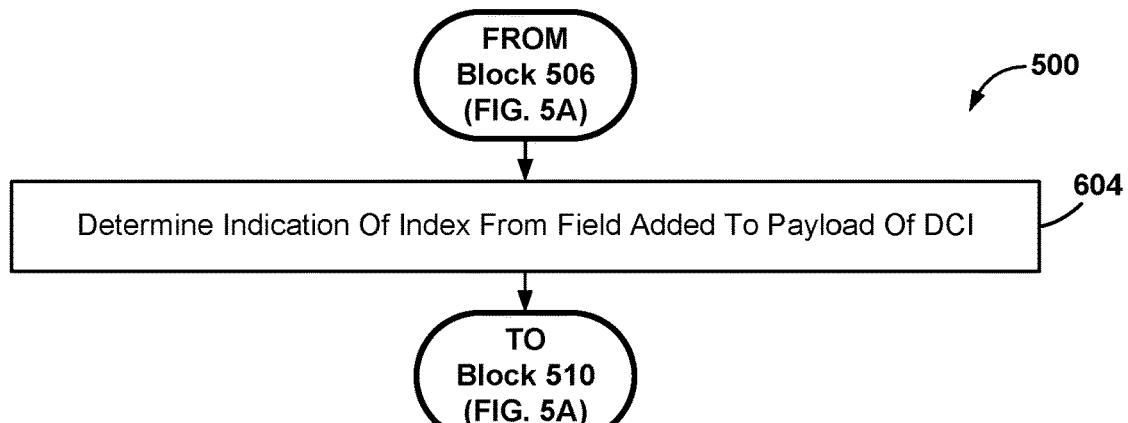

Referring to FIG. 6B, in some implementations following the operations of block 506 (FIG. 5A), the processor may determine an indication of the index from a field added to the payload of the DCI in block 604.

The processor may then perform the operations of block 510 (FIG. 5A).

Figure 6C:
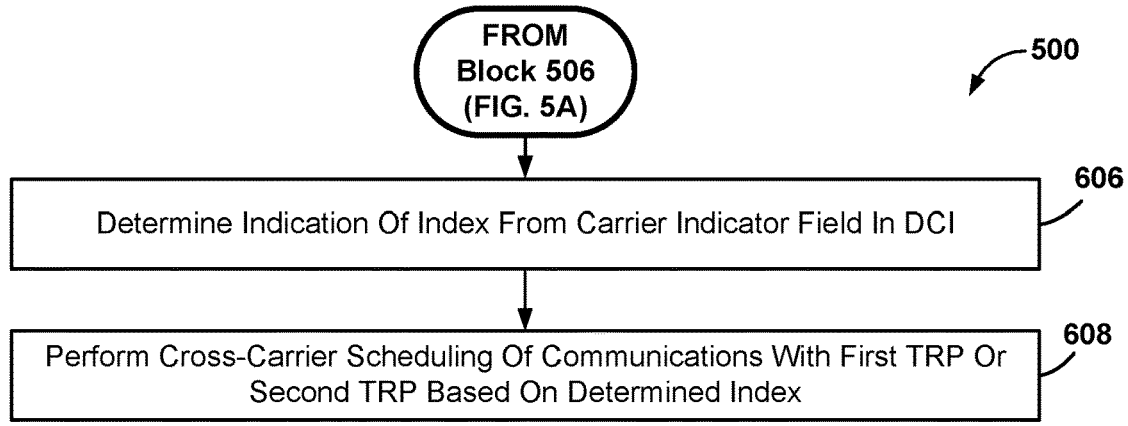

Referring to FIG. 6C, in some implementations following the operations of block 506 (FIG. 5A), the processor may perform determine an indication of the index from a carrier indicator field (CIF) in the DCI in block 606. In some implementations, the CIF may indicate one of a first higher layer parameter and a second higher layer parameter, each associated with a value of the index in the CIF. In some implementations, the CIF may correspond to a first value indicating the scheduled cell, and the second DCI includes a second CIF that corresponds to a second value indicating the scheduled cell. In some implementations, the first higher layer parameter may correspond to a CORESET pool index of 0, and the second higher layer parameter may correspond to a CORESET pool index of 1. In some implementations, the scheduled cell may be configured by a PDCCH-Config parameter that includes two CORESET pool index values in CORESETs for an active bandwidth part (BWP) of the scheduled cell.

In block 608, the processor may perform cross-carrier scheduling of communications with the first TRP or the second TRP based on the determined index.

Figure 6D:
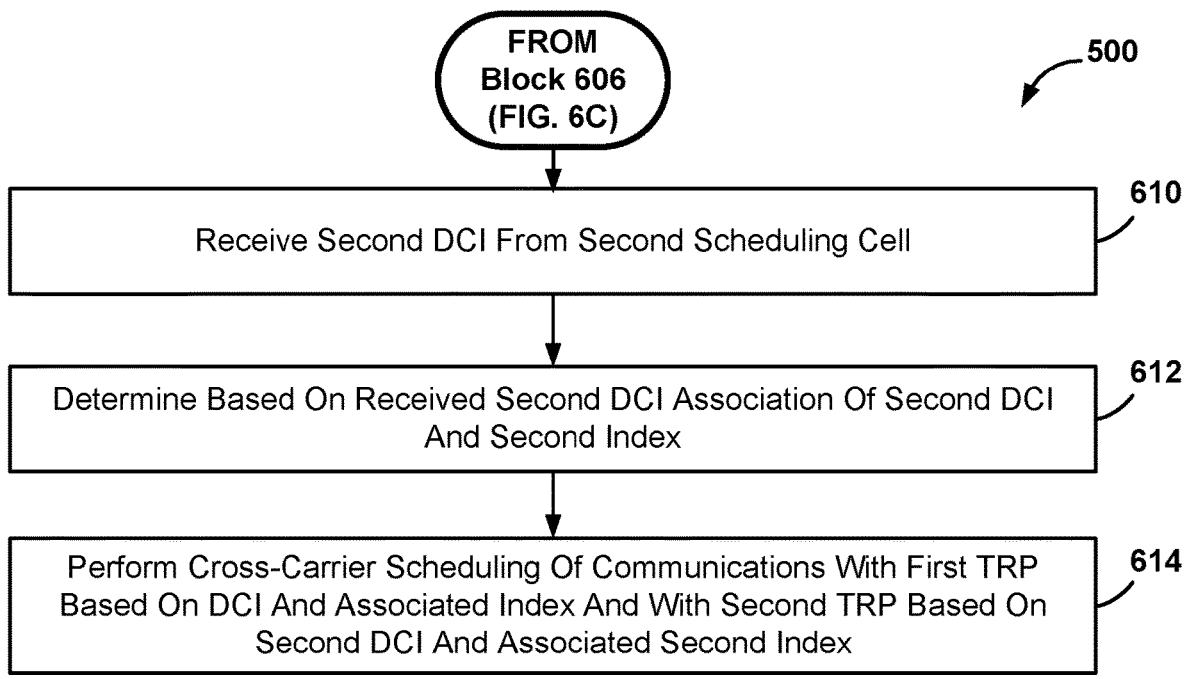

Referring to FIG. 6D, in some implementations following the operations of block 606 (FIG. 6C), the processor may receive a second DCI from a second scheduling cell in block 610. For example, in some implementations, the scheduled cell may be configured by a PDCCH-Config parameter that includes two CORESET pool index values in CORESETs for an active bandwidth part (BWP) of the serving cell.

In block 612, the processor may determine based on the received second DCI an association of the second DCI and a second index. I In block 614, the processor may perform cross-carrier scheduling of communications with the first TRP based on the DCI and the associated index and with the second TRP based on the second DCI and the associated second index.

Figure 6E:
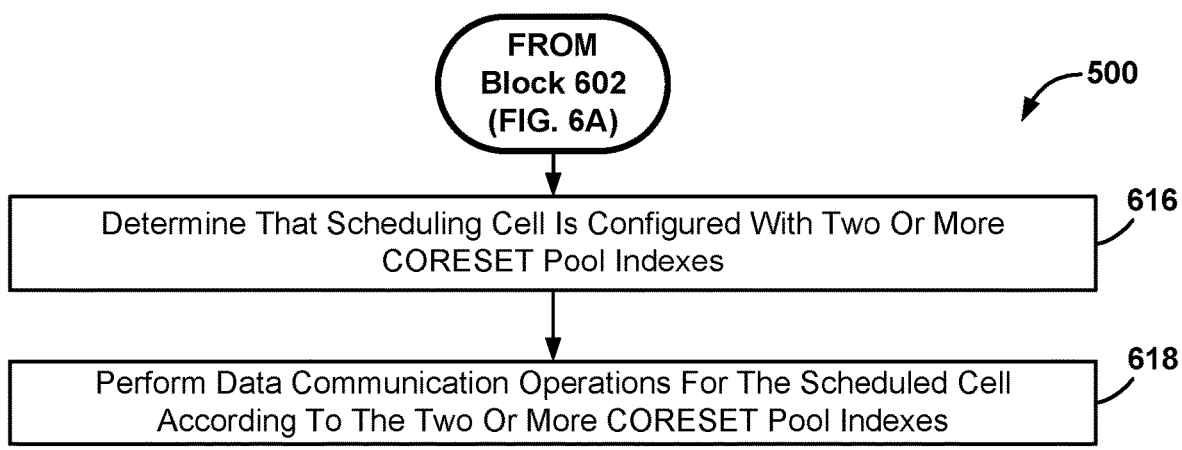

Referring to FIG. 6E, in some implementations following the operations of block 602 (FIG. 6A), the processor may determine that the scheduling cell is configured with two or more CORESET pool indexes in block 616.

In block 618, the processor may perform data communication operations for the scheduled cell according to the two or more CORESET pool indexes.

Figure 6F:
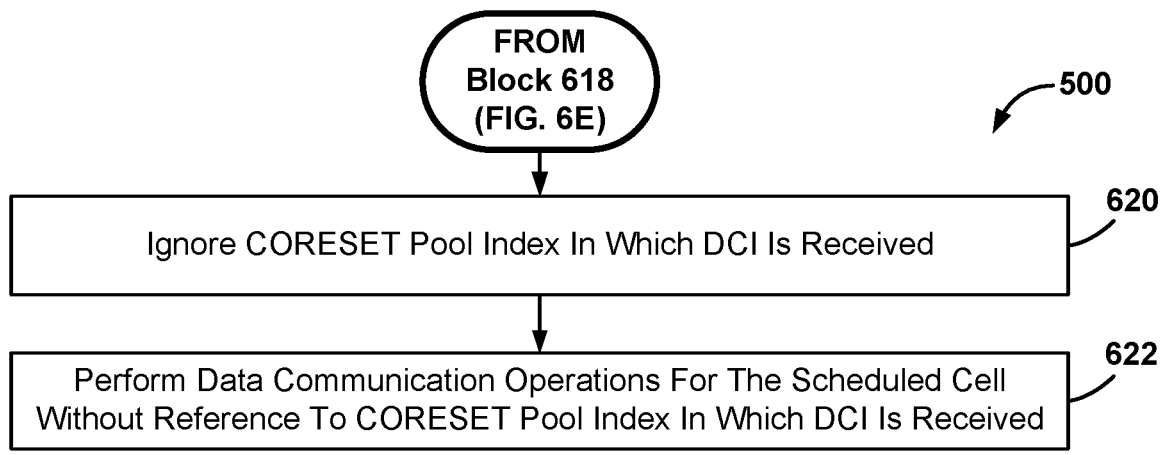

Referring to FIG. 6F, in some implementations following the operations of block 618 (FIG. 6E), the processor may ignore a CORESET pool index in which the DCI is received in block 620.

In block 622, the processor may perform data communication operations for the scheduled cell without reference to the CORESET pool index in which the DCI is received.

Figure 6G:
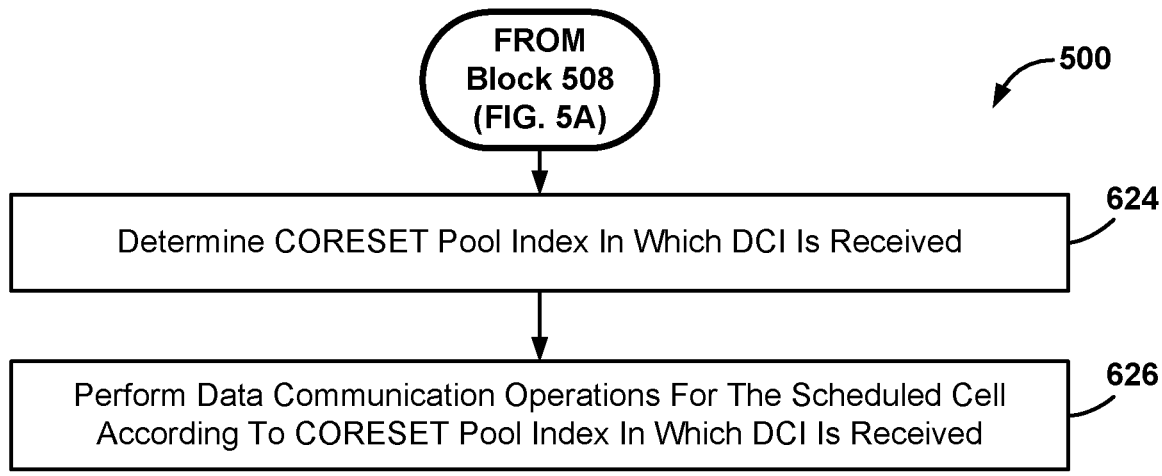

Referring to FIG. 6G, in some implementations following the operations of block 508 (FIG. 5A), the processor may determine a CORESET pool index in which the DCI is received in block 624.

In block 626, the processor may perform data communication operations according to the CORESET pool index in which the DCI is received.

Figure 6H:
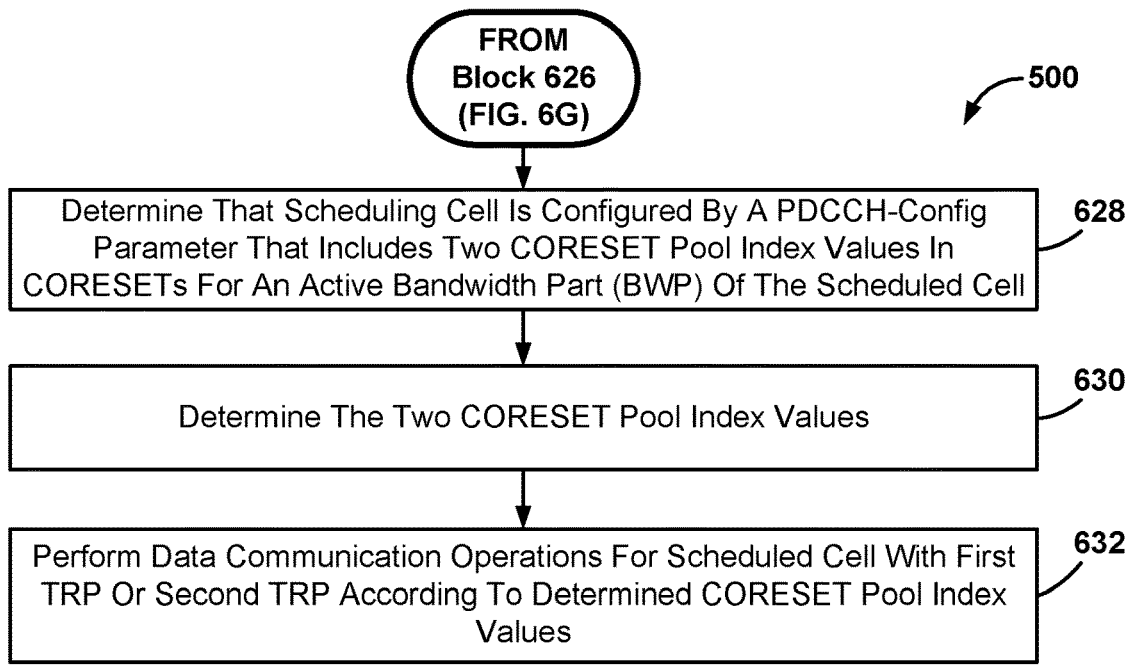

Referring to FIG. 6H in some implementations following the operations of block 626 (FIG. 6G), the processor may determine that the scheduling cell is configured by a PDCCH-Config parameter that includes two CORESET pool index values in CORESETs for an active bandwidth part (BWP) of the scheduled cell in block 628

In block 630, the processor may perform operations including determining the two CORESET pool index values.

In block 632, the processor may perform operations including performing data communication operations for the scheduled cell with the first TRP or the second TRP according to the determined CORESET pool index values.

Figure 6I:
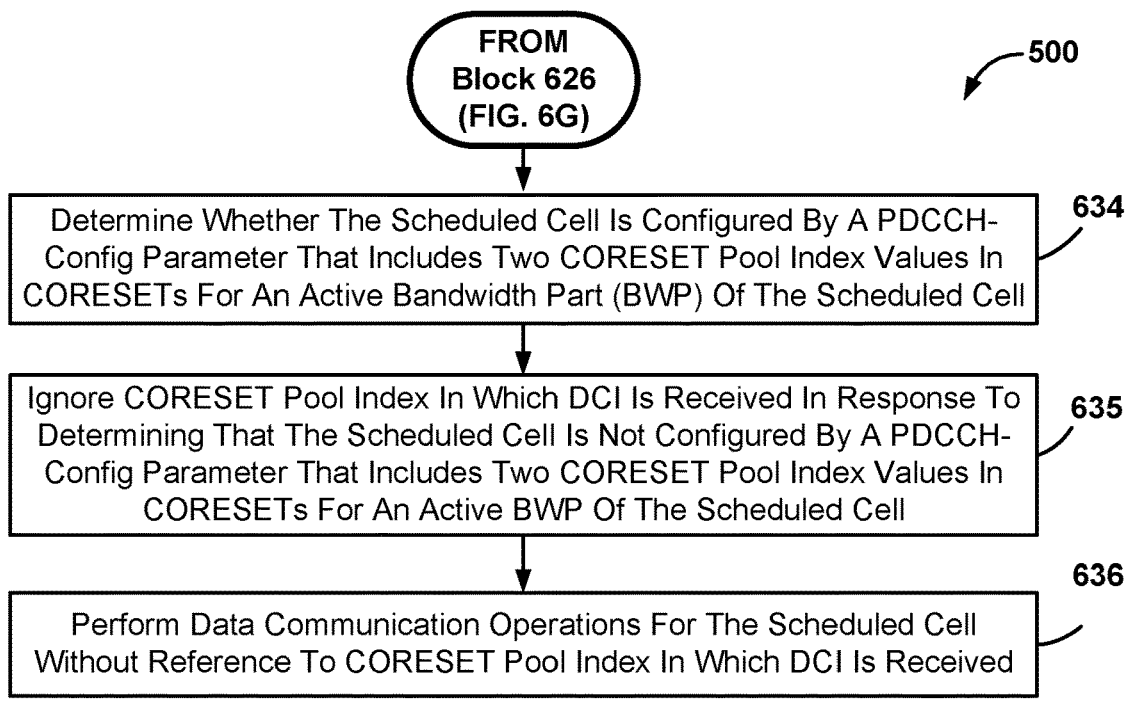

Referring to FIG. 6I in some implementations following the operations of block 626 (FIG. 6G), the processor may determine whether the scheduled cell is configured by a PDCCH-Config parameter that includes two CORESET pool index values in CORESETs for an active bandwidth part (BWP) of the scheduled cell in block 634.

In block 635, the processor may ignore a CORESET pool index in which the DCI is received in response to determining that the scheduled cell is not configured by a PDCCH-Config parameter that includes two CORESET pool index values in CORESETs for an active bandwidth part (BWP) of the scheduled cell.

In block 636, the processor may perform operations including performing data communication operations for the scheduled cell without reference to the CORESET pool index in which the DCI is received.

Figure 6J:
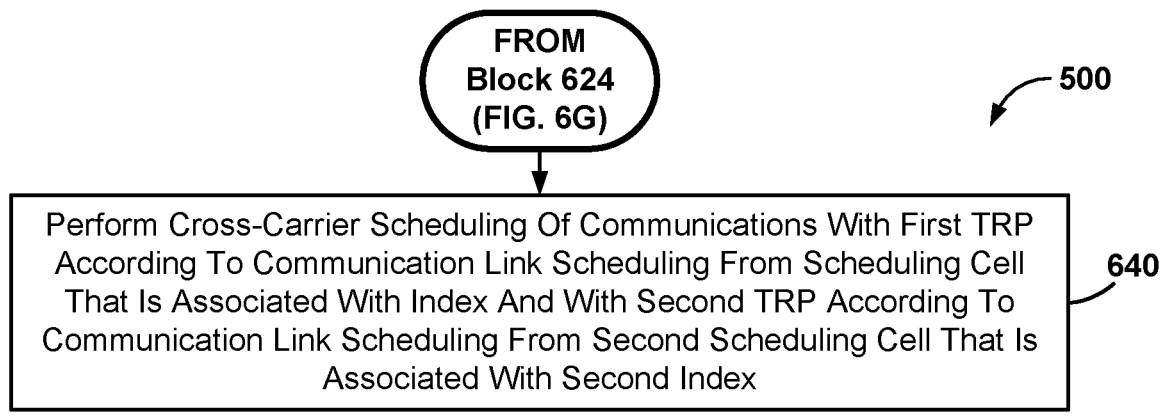

Referring to FIG. 6J, in some implementations, the index may include a first CORESET pool index value configured for all CORESETs in the scheduled cell, and a second index may include a second CORESET pool index value configured for all CORESETs in a second scheduling cell. In such implementations, following the operations of block 626 (FIG. 6G), the processor may perform cross-carrier scheduling of communications with a first TRP according to communication link scheduling from the scheduling cell that is associated with the index, and with a second TRP according to communication link scheduling from a second scheduling cell that is associated with the second index in block 640.

Figure 7:
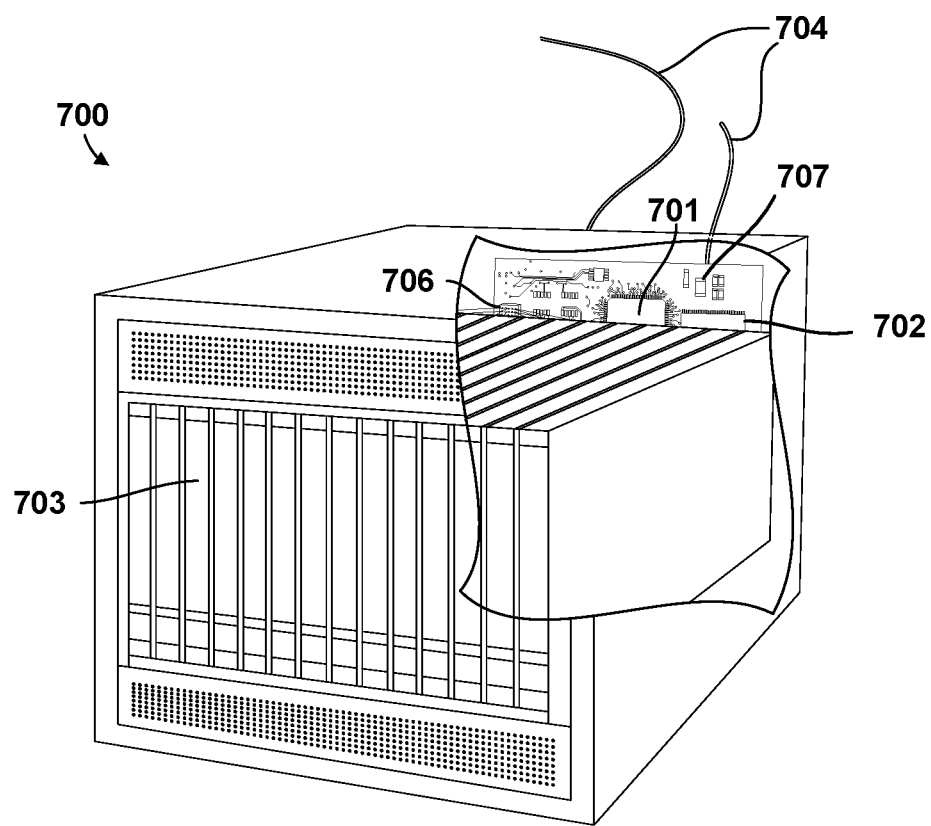
FIG. 7 shows a component block diagram of an example network computing device.

FIG. 7 shows a component block diagram of an example network computing device 700. In some implementations, the wireless network computing device 700 may function as a network element of a communication network, such as a base station. The network computing device 700 may include at least the components illustrated in FIG. 7. With reference to FIGS. 1-7, the network computing device 700 may typically include a processor 701 coupled to volatile memory 702 and a large capacity nonvolatile memory, such as a disk drive 703. The network computing device 700 also may include a peripheral memory access device such as a floppy disc drive, compact disc (CD) or digital video disc (DVD) drive 706 coupled to the processor 701. The network computing device 700 also may include network access ports 704 (or interfaces) coupled to the processor 701 for establishing data connections with a network, such as the Internet or a local area network coupled to other system computers and servers. The network computing device 700 may include one or more antennas 707 for sending and receiving electromagnetic radiation that may be connected to a wireless communication link. The network computing device 700 may include additional access ports, such as USB, Firewire, Thunderbolt, and the like for coupling to peripherals, external memory, or other devices.

Figure 8:
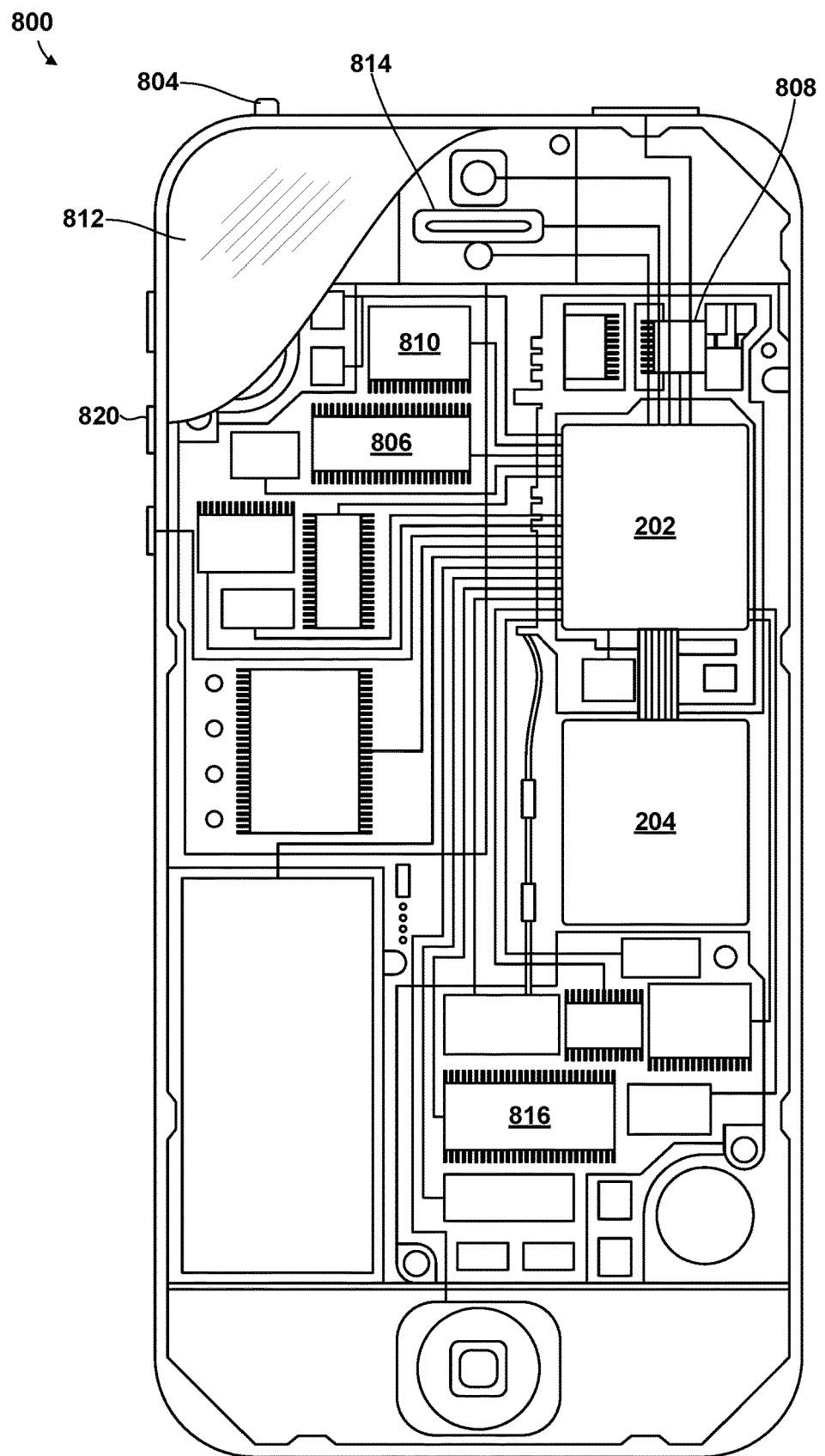
FIG. 8 shows a component block diagram of an example wireless device.

FIG. 8 shows a component block diagram of an example wireless device. In some implementations, the wireless device may be implemented as a variety of wireless devices (for example, the wireless device 102, 200, 320), an example of which is illustrated in FIG. 8 in the form of a smartphone 800. The smartphone 800 may include a first SOC 202 (for example, a SOC-CPU) coupled to a second SOC 204 (for example, a 5G capable SOC). The first and second SOCs 202, 204 may be coupled to internal memory 806, 816, a display 812, and to a speaker 814. Additionally, the smartphone 800 may include an antenna 804 for sending and receiving electromagnetic radiation that may be connected to a wireless data link or cellular telephone transceiver 808 coupled to one or more processors in the first or second SOCs 202, 204. Smartphones 800 typically also include menu selection buttons or rocker switches 820 for receiving user inputs.

A typical smartphone 800 also includes a sound encoding/decoding (CODEC) circuit 810, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 808 and CODEC 810 may include a digital signal processor (DSP) circuit (not shown separately).

The processors of the wireless network computing device 700 and the smart phone 800 may be any programmable microprocessor, microcomputer or multiple processor chip or chips that can be configured by software instructions (applications) to perform a variety of functions, including the functions of the various implementations. In some wireless devices, multiple processors may be provided, such as one processor within an SOC 204 dedicated to wireless communication functions and one processor within an SOC 202 dedicated to running other applications. Typically, software applications may be stored in the memory 806, 816 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a non-transitory processor-readable storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available non-transitory storage media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more aspects, the functions described may be implemented by a processor, which may be coupled to a memory. The memory may be a non-transitory computer-readable storage medium that stores processor-executable instructions. The memory may store an operating system, user application software, or other executable instructions. The memory also may store application data, such as an array data structure. The processor may read and write information to and from the memory. The memory also may store instructions associated with one or more protocol stacks. A protocol stack generally includes computer executable instructions to enable communication using a radio access protocol or communication protocol.

Various modifications to the implementations described in this disclosure may be readily apparent to those skilled in the art, and the generic principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of managing cross-carrier scheduling at a wireless device, comprising:
   receiving downlink control information (DCI) carried by a Control Resource Set (CORESET) from a scheduling cell;
   associating the DCI and a CORESET pool index of the CORESET that carried the DCI; and
   performing cross-carrier scheduling of data communication operations with a first transmit-receive point (TRP) or a second TRP based on the DCI and the associated CORESET pool index.

2. The method of claim 1, wherein the CORESET pool index comprises an indication of one of the first TRP and the second TRP.

3. The method of claim 1, wherein associating the DCI and the CORESET pool index of the CORESET that carried the DCI comprises:
   associating the DCI and the CORESET pool index using information in a field in a payload of the DCI.

4. The method of claim 3, wherein associating the DCI and the CORESET pool index using the information in the field in the payload of the DCI comprises:
   selecting an indication of the CORESET pool index from a field added to the payload of the DCI.

5. The method of claim 3, wherein associating the DCI and the CORESET pool index using the information in the field in the payload of the DCI comprises:
   selecting an indication of the CORESET pool index from a carrier indicator field (CIF) in the DCI.

6. The method of claim 5, wherein the CIF indicates one of a first higher layer parameter and a second higher layer parameter, each of the first higher layer parameter and the second higher layer parameter being associated with a value of the CORESET pool index.

7. The method of claim 6, wherein the first higher layer parameter comprises a CORESET pool index of 0, and the second higher layer parameter comprises a CORESET pool index of 1.

8. The method of claim 5, wherein performing the cross-carrier scheduling of the data communication operations with the first TRP or the second TRP based on the DCI and the associated CORESET pool index comprises:
   performing the cross-carrier scheduling of the data communication operations with the first TRP or the second TRP in response to selecting the indication of the CORESET pool index.

9. The method of claim 1, further comprising receiving a Radio Resource Control (RRC) configuration indicating that the scheduling cell is configured by a Physical Downlink Control Channel (PDCCH)-Config parameter that comprises two CORESET pool index values in CORESETs for an active bandwidth part (BWP) of a scheduled cell.

10. The method of claim 9, wherein the associated CORESET pool index comprises one of the two CORESET pool index values.

11. The method of claim 1, further comprising receiving an RRC configuration indicating that a scheduled cell is configured to perform multi-Physical Downlink Shared Channel (PDSCH)-multi-TRP communications.

12. The method of claim 1, further comprising receiving an RRC configuration indicating that the scheduling cell is configured by a PDCCH-Config parameter that comprises one CORESET pool index value in all CORESETs for an active bandwidth part (BWP) of a scheduled cell or is not configured with a CORESET pool index value.

13. The method of claim 1, further comprising:
   receiving an RRC configuration indicating that a scheduled cell is configured by a PDCCH-Config parameter that comprises two CORESET pool index values in CORESETs for an active bandwidth part (BWP) of the scheduled cell,
   receiving a second DCI from a second scheduling cell; and
   associating the second DCI and a second CORESET pool index in response to receiving the second DCI,
   wherein performing the cross-carrier scheduling of the data communication operations with the first TRP or the second TRP based on the DCI and the associated CORESET pool index comprises performing the cross-carrier scheduling of the data communication operations with the first TRP based on the DCI and a first of the two CORESET pool index values and with the second TRP based on the second DCI and a second of the two CORESET pool index values.

14. The method of claim 13, wherein a CIF in the DCI from the scheduling cell corresponds to a first value indicating the scheduled cell, and the second DCI from the second scheduling cell includes a second CIF that corresponds to a second value indicating the scheduled cell.

15. The method of claim 1, further comprising:
   receiving an RRC configuration indicating that the scheduling cell is configured with two or more CORESET pool index values; and performing data communication operations for a scheduled cell according to the two or more CORESET pool index values.

16. The method of claim 15, further comprising:
receiving an RRC configuration indicating that the scheduled cell is not configured with two or more CORESET pool index values; and
performing data communication operations for the scheduled cell independent of a CORESET pool index of a CORESET that carried the DCI.

17. The method of claim 1, wherein associating the DCI and the CORESET pool index of the CORESET that carried the DCI comprises:
selecting a CORESET pool index of the CORESET that carried the DCI;
the method further comprising performing data communication operations for a scheduled cell according to the CORESET pool index of the CORESET that carried the DCI.

18. The method of claim 17, further comprising:
receiving an RRC configuration indicating that the scheduling cell is configured by a PDCCH-Config parameter that comprises two CORESET pool index values in CORESETs for an active bandwidth part (BWP) of the scheduled cell; and
selecting the two CORESET pool index values;
wherein performing data communication operations for the scheduled cell according to the CORESET pool index of the CORESET that carried the DCI comprises performing the data communication operations for a scheduled cell with the first TRP or the second TRP according to the selected two CORESET pool index values.

19. The method of claim 17, further comprising:
receiving an RRC configuration indicating that the scheduled cell is not configured with two CORESET pool index values in CORESETs for an active bandwidth part (BWP) of the scheduled cell;
wherein performing data communication operations for the scheduled cell according to the CORESET pool index of the CORESET that carried the DCI comprises performing the data communication operations for the scheduled cell independent of the selected CORESET pool index of the CORESET that carried the DCI after receiving the RRC configuration indicating that the scheduled cell is not configured with two CORESET pool index values in CORESETs for the active bandwidth part BWP of the scheduled cell.

20. The method of claim 17, wherein the CORESET pool index comprises a first CORESET pool index value configured for all CORESETs in the scheduling cell, and a second CORESET pool index value configured for all CORESETs in a second scheduling cell,
wherein performing cross-carrier scheduling of data communication operations with a first TRP or a second TRP based on the DCI and the associated CORESET pool index comprises performing cross-carrier scheduling of communications with the first TRP according to communication link scheduling from the scheduling cell associated with the first CORESET pool index value and with the second TRP according to communication link scheduling from the second scheduling cell that is associated with the second CORESET pool index value.

21. The method of claim 1, wherein:
the received DCI schedules a scheduled cell, and
performing cross-carrier scheduling of data communication operations with the first TRP or the second TRP based on the DCI and the associated CORESET pool index comprises performing cross-carrier scheduling of data communication operations with the first TRP or the second TRP in response to receiving the DCI that schedules the scheduled cell.

22. An apparatus for wireless communication, comprising:
a first interface configured to:
obtain downlink control information (DCI) carried by a Control Resource Set (CORESET) from a scheduling cell; and a processing system coupled to the first interface and configured to:
associate the DCI and a CORESET pool index of the CORESET that carried the DCI; and
initiate cross-carrier scheduling of data communication operations with a first transmit-receive point (TRP) or a second TRP based on the DCI and the associated CORESET pool index.

23. The apparatus of claim 22, wherein the CORESET pool index comprises an indication of one of the first TRP and the second TRP.

24. The apparatus of claim 22, wherein the processing system is further configured to:
associate the DCI and the CORESET pool index using information in a field in a payload of the DCI.

25. The apparatus of claim 24, wherein the processing system is further configured to:
select an indication of the CORESET pool index from a field added to the payload of the DCI.

26. The apparatus of claim 24, wherein the processing system is further configured to:
select an indication of the CORESET pool index from a carrier indicator field (CIF) in the DCI.

27. The apparatus of claim 26, wherein the CIF indicates one of a first higher layer parameter and a second higher layer parameter, each of the first higher layer parameter and the second higher layer parameter being associated with a value of the CORESET pool index.

28. A wireless device, comprising:
a transceiver configured to:
receive downlink control information (DCI) carried by a Control Resource Set (CORESET) from a scheduling cell; and
a processing system coupled to the transceiver and configured with processor-executable instructions to:
associate the DCI and a CORESET pool index of the CORESET that carried the DCI; and
initiate cross-carrier scheduling of data communication operations with a first transmit-receive point (TRP) or a second TRP based on the DCI and the associated CORESET pool index.

29. The wireless device of claim 28, wherein the CORESET pool index comprises an indication of one of the first TRP and the second TRP.

30. The wireless device of claim 28, wherein the processing system is further configured with processor-executable instructions to associate the DCI and the CORESET pool index using information in a field in a payload of the DCI.

* * * * *